United States Patent
Li et al.

(10) Patent No.: US 9,800,375 B2
(45) Date of Patent: Oct. 24, 2017

(54) METHOD AND APPARATUS FOR SOFT BUFFER PROCESSING

(71) Applicant: Samsung Electronics Co. Ltd., Suwon-si, Gyeonggi-do (KR)

(72) Inventors: Yingyang Li, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 13/622,679

(22) Filed: Sep. 19, 2012

(65) Prior Publication Data

US 2013/0070652 A1    Mar. 21, 2013

(30) Foreign Application Priority Data

Sep. 20, 2011    (CN) .......................... 2011 1 0279383
Apr. 9, 2012    (CN) .......................... 2012 1 0102331
(Continued)

(51) Int. Cl.
*H04J 3/00*    (2006.01)
*H04L 1/18*    (2006.01)
(Continued)

(52) U.S. Cl.
CPC .......... *H04L 1/1822* (2013.01); *H04L 1/1835* (2013.01); *H04L 1/1819* (2013.01);
(Continued)

(58) Field of Classification Search
CPC .................................................... H04W 72/04
(Continued)

(56) References Cited

U.S. PATENT DOCUMENTS

| 8,654,666 B2 * | 2/2014 | Chung et al. .................. 370/252 |
| 2011/0035639 A1 * | 2/2011 | Earnshaw ............. H04L 1/1812 |
| | | 714/748 |

(Continued)

FOREIGN PATENT DOCUMENTS

| KR | 10-2009-0075628 A | 7/2009 |
| KR | 10-2011-0090754 A | 8/2011 |
| WO | 2007/024098 A1 | 3/2007 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 10); Jun. 2011.

(Continued)

*Primary Examiner* — Hassan Kizou
*Assistant Examiner* — Abdullahi Ahmed
(74) *Attorney, Agent, or Firm* — Jefferson IP Law, LLP

(57) ABSTRACT

A network side equipment, a user equipment, and a method for soft buffer processing are provided. The method includes allocating, by a base station, transmission resource for a User Equipment (UE), and processing a soft buffer according to at least one parameter of the soft buffer, when uplink and downlink configurations of a plurality of cells of the UE Carrier Aggregation (CA) are different, sending, by the base station, data to the UE by a Physical Downlink Control Channel (PDCCH) and a Physical Downlink Shared Channel (PDSCH), wherein the at least one parameter of soft buffer is determined by at least one of a Primary cell (Pcell) and a Secondary cell (Scell) uplink and downlink configurations of the UE, and wherein rate matching is performed on the PDSCH.

10 Claims, 4 Drawing Sheets

(30) Foreign Application Priority Data

| Aug. 1, 2012 | (CN) | .......................... 2012 1 0272807 |
| Aug. 9, 2012 | (CN) | .......................... 2012 1 0283161 |
| Aug. 31, 2012 | (CN) | .......................... 2012 1 0320653 |

(51) Int. Cl.
    *H04L 5/00*     (2006.01)
    *H04L 5/14*     (2006.01)

(52) U.S. Cl.
    CPC ............ *H04L 1/1854* (2013.01); *H04L 5/001* (2013.01); *H04L 5/0023* (2013.01); *H04L 5/0055* (2013.01); *H04L 5/1469* (2013.01)

(58) Field of Classification Search
    USPC ........................................................ 370/280
    See application file for complete search history.

(56) References Cited

U.S. PATENT DOCUMENTS

| 2011/0292894 | A1* | 12/2011 | Wu | ..................... H04L 1/1812 370/329 |
| 2012/0087395 | A1* | 4/2012 | Chmiel et al. | ................ 375/211 |
| 2012/0201229 | A1* | 8/2012 | Feng | ..................... H04L 5/0053 370/336 |
| 2012/0269138 | A1 | 10/2012 | Han et al. | |
| 2013/0051289 | A1* | 2/2013 | Hsieh et al. | .................. 370/280 |
| 2013/0176981 | A1* | 7/2013 | Earnshaw | ................ H04L 1/02 370/329 |
| 2013/0242799 | A1* | 9/2013 | Yin | ...................... H04L 1/1861 370/254 |
| 2013/0336263 | A1* | 12/2013 | Wang | ........................... 370/329 |

OTHER PUBLICATIONS

Ericsson, "Number of DL HARQ Processes for TDD", 3GPP Draft, R1-080891, 3rd Generation Partnership Project (3GPP), Feb. 11-15, 2008, Sorrento, Italy.

Ericsson, "On Soft Buffer Usage for LTE TDD", 3GPP Draft, R1-082018, 3rd Generation Partnership Project (3GPP), May 5-9, 2008, Kansas City, USA.

Huawei et al., "Soft Buffer Size Allocation for Rel-10 Downlink", 3GPP Draft, R1-110008, 3rd Generation Partnership Project (3GPP), Jan. 17-21, 2011, Dublin, Ireland.

"On Support of Inter-band CA with Different TDD UL-DL Configurations", R1-112247, Aug. 16, 2011, Athens, Greece.

"HARQ Feedback Mechanism in CA with Different TDD Configurations", R1-112349, Aug. 17, 2011, Athens, Greece.

* cited by examiner

METHOD AND APPARATUS FOR SOFT BUFFER PROCESSING

PRIORITY

This application claims the benefit under 35 U.S.C. §119(a) of a Chinese patent application filed on Sep. 20, 2011 in the State Intellectual Property Office (SIPO) of the People's Republic of China and assigned Serial No. 201110279383.7, a Chinese patent application filed on Apr. 9, 2012 in the SIPO and assigned Serial No. 201210102331.7, a Chinese patent application filed on Aug. 1, 2012 in the SIPO and assigned Serial No. 201210272807.1, a Chinese patent application filed on Aug. 9, 2012 in the SIPO and assigned Serial No. 201210283161.7 and a Chinese patent application filed on Aug. 31, 2012 in the SIPO and assigned Serial No. 201210320653.9, the entire disclosure of each of which is hereby incorporated by reference.

BACKGROUND OF THE INVENTION

1. Field of the Invention

The present invention relates to mobile communications. More particularly, the present invention relates to a method and an apparatus for soft buffer processing of downlink data transmitted based on a Hybrid Automatic Repeat Request (HARQ).

2. Description of the Related Art

A Long Term Evolution (LTE) system supports a working mode of Time Division Duplex (TDD).

FIG. 1 illustrates a frame structure of a TDD system according to the related art.

Referring to FIG. 1, each wireless frame has a length of 10 ms, which is bisected into two half-frames with a length of 5 ms. Each half-frame includes eight time slots with a length of 0.5 ms and three special fields, i.e., a Downlink Pilot Time Slot (DwPTS), a Guard Period (GP), and an Uplink Pilot Time Slot (UpPTS), the sum of the length of which is 1 ms. Each subframe is formed of two continuous time slots, i.e., the kth subframe includes time slot 2k and time slot 2k+1. The TDD system supports seven different uplink and downlink configurations as shown in FIG. 1. Here, D represents a downlink subframe, U represents an uplink subframe, and S represents the special subframe including three special fields. Table 1 illustrates Uplink and Downlink Configurations of LTE TDD.

TABLE 1

| Configuration No. | Conversion Point Period | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

To improve users' transmission rate, in an enhanced LTE-Advanced (LTE-A) system of the LTE system, a greater working bandwidth is obtained from aggregating a plurality of Component Carrier (CC), i.e., Carrier Aggregation (CA), and uplink and downlink of a communications system is constituted, thereby supporting a higher transmission rate. For example, support for a bandwidth of 100 MHz is obtained by aggregating five CCs of 20 MHz, wherein each CC is referred to as a Cell. For a User Equipment (UE), a base station can configure the UE to work in a plurality of downlink Cells, wherein one Cell is a Primary cell (Pcell) while other Cells are referred to as Secondary cells (Scells).

In Release 10 of the LTE TDD system, a plurality of Cells which are restricted to be aggregated together use the same uplink and downlink configuration, such that when a HARQ transmission timing is processed, it is possible to completely reuse the timing relation of a HARQ defining one Cell in LTE, thereby requiring no additional standardization work. Specifically, similar to Release 8 of LTE the TDD, a Physical Downlink Control Channel (PDCCH) is used for scheduling a Physical Downlink Shared Channel (PDSCH) within the current subframe for HARQ transmission of downlink data. One uplink subframe n can feedback the ACKnowledgement/Non-ACKnowledgement (ACK/NACK) information corresponding to the PDSCH or the PDCCH of downlink Semi-Persistent Scheduling (SPS) release in zero, one or a plurality of downlink subframes, the index of these downlink subframes being n-k, wherein k belongs to set K which is determined by uplink and downlink configurations and uplink subframe n, as shown in Table 2.

TABLE 2

Index Set K

| Uplink and Downlink Configurations | Subframe Index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

According to the timing relation of HARQ, in Release 8/9/10 of LTE TDD, the maximum numbers of downlink HARQ processes corresponding to the above seven TDD uplink and downlink configurations are different. Here, the maximum number of downlink HARQ processes to each TDD uplink and downlink configuration ensures that the base station can be indexed by HARQ processes of the PDCCH and can identify respective parallel HARQ processes without confusion.

TABLE 3

Maximum Number of downlink HARQ processes

| Uplink and downlink configurations | Maximum Number of downlink HARQ processes |
|---|---|
| 0 | 4 |
| 1 | 7 |
| 2 | 10 |
| 3 | 9 |
| 4 | 12 |

TABLE 3-continued

Maximum Number of downlink HARQ processes

| Uplink and downlink configurations | Maximum Number of downlink HARQ processes |
|---|---|
| 5 | 15 |
| 6 | 6 |

Table 3 illustrates the timing relation of HARQ in Release 10 of LTE TDD. Another problem relating to HARQ is how to process a soft buffer. A UE is divided into a plurality of classes according to its processing capacity, based on whether or not the UE supports Multiple-Input Multiple-Output (MIMO), the number of the maximum data stream of the supported MIMO, the size of soft buffer, and the like. Here, the soft buffer is used to store the received soft bits, when the UE fails to correctly decode the data sent by the base station, and enables soft combining during HARQ retransmission, thereby improving link performance. The processing of the soft buffer affects Rate Matching (RM) for downlink data. In Release 10 of LTE TDD, the soft buffer of the UE is described as $N_{soft}$, and no matter whether the UE is in a single carrier mode or a CA mode, RM is performed for each code block of one transport block according to the size of soft buffer $$N_{cb} = \min\left(\left\lfloor \frac{N_{IR}}{C} \right\rfloor, K_w\right),$$

wherein C is the sum of the code blocks divided by the transport block, $$N_{IR} = \left\lfloor \frac{N_{soft}}{K_C \cdot K_{MIMO} \cdot \min(M_{DL\_HARQ}, M_{limit})} \right\rfloor,$$

$K_{MIMO}$ depends on the transmission mode of the UE, $K_{MIMO}=2$ for the MIMO transmission mode, $K_{MIMO}=1$ for the non-MIMO transmission mode, $M_{DL\_HARQ}$ is the maximum number of downlink HARQ processes set forth in the above Table 3, $M_{limit}$ is a constant 8, $K_c$ is a constant relating to UE category, and K is the sum of the encoding bits transmitted by turbo codes. Specifically, no matter which carriers the UE works in, RM is performed according to the condition that the UE only configures the current one carrier. When the UE configures a plurality of Cells, the processing result is that the hypothetical HARQ soft buffer for one code block in RM may be greater than the soft buffer capacity that the UE can support. In Release 10 of LTE TDD, suppose that the UE equally divides its soft buffer to a plurality of Cells. In order to better support HARQ Incremental Redundancy (IR), the base station should know which soft bits the UE stores when the UE fails to correctly decode one code block. Therefore, the number of the carrier configured by the UE is described as $N_{cells}^{DL}$, and for each Cell and at least $K_{MIMO}\cdot\min(M_{DL\_HARQ}, M_{limit})$ transport blocks, when one code block of one transport block fails to decode, it is regulated in LTE-A that the UE at least needs to store soft bits $w_k$ $w_{k+1}, \ldots, w_{mod(k+n_{SB}-1, N_{cb})}$ for this code block, wherein $$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right),$$

$w_k$ is a soft bit received by the UE, and k is a smaller index in the indexes of respective soft bits received by the UE.

As the distance of the frequency domain between a plurality of Cells that perform carrier aggregation is large enough, these Cells entirely can use different uplink and downlink configurations without interference to each other. Thus, in the subsequent study of LTE-A, a very significant research project is how to efficiently support different uplink and downlink configurations of a plurality of Cells. Since the uplink and downlink configuration for UE is different in different Cells, there will be a structure where some Cells are uplink subframes while others are downlink subframes in the same subframe. This is different from Release 10 of LTE TDD and accordingly, the timing relation of HARQ may need to be re-defined.

Therefore, a need exists for a method and an apparatus for soft buffer processing of data in HARQ transmission.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for soft buffer processing of a Hybrid Automatic Repeat Request (HARQ) downlink data transmission by putting forward a scheme of processing a soft buffer in a Carrier Aggregation (CA) system where uplink and downlink configurations of a plurality of Cells are different.

In accordance with an aspect of the present invention, a method for soft buffer processing is provided. The method includes allocating, by a base station, a transmission resource for a User Equipment (UE), and processing a soft buffer according to at least one parameter of the soft buffer, when the uplink and downlink configurations of a plurality of Cells of the UE CA are different, sending, by the base station, data to the UE by a Physical Downlink Control Channel (PDCCH) and a Physical Downlink Shared Channel (PDSCH), wherein the at least one parameter of the soft buffer is determined by at least one of a Primary cell (Pcell) and a Secondary cell (Scell) uplink and downlink configurations of the UE, and wherein Rate Matching is performed on the PDSCH.

In accordance with another aspect of the present invention, a method for soft buffer processing is provided. The method includes receiving, by a UE, transmission resource information that a base station allocates for it, and processing a soft buffer according to at least one parameter of the soft buffer when uplink and downlink configurations of a plurality of Cells of the UE carrier aggregation are different, and receiving, by the UE, the PDCCH and the PDSCH sent by the base station, according to the transmission resource and the at least one parameter of the soft buffer, wherein the at least one parameter of soft buffer is determined by Pcell and/or Scell uplink and downlink configurations of the UE.

In accordance with another aspect of the present invention, a network side equipment is provided. The network side equipment includes a resource management module for allocating a transmission resource for a UE, and for processing a soft buffer according to at least one parameter of the soft buffer when uplink and downlink configurations of a plurality of Cells of the UE CA are different, wherein the at least one parameter of the soft buffer is determined by at least one of a Pcell and a Scell uplink and downlink configurations of the UE, and a sending module for performing rate matching on the PDSCH and for sending data to the UE by the PDCCH and the PDSCH.

In accordance with another aspect of the present invention, a UE is provided. The UE includes a resource management module for determining transmission resource information that a base station allocates for it, and for processing a soft buffer according to at least one parameter of the soft buffer when uplink and downlink configurations of a plurality of Cells of the UE carrier aggregation are different, wherein the at least one parameter of the soft buffer is determined by at least one of a Pcell and a Scell uplink and downlink configurations of the UE, and a receiving module for receiving the PDCCH and the PDSCH sent by the base station, according to the transmission resource and the at least one parameter of processing the soft buffer.

The above exemplary methods or equipments of the present invention are capable of reasonably and efficiently addressing the issue of soft buffer processing of data in HARQ downlink transmission in a CA system, where uplink and downlink configurations of a plurality of Cells are different, optimizing the operation of HARQ incremental redundancy, and improving decoding performance of a UE. The above scheme set forth in exemplary embodiments of the present invention is simple, efficient, and only has a little change to the current system and will not affect the compatibility of the system.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
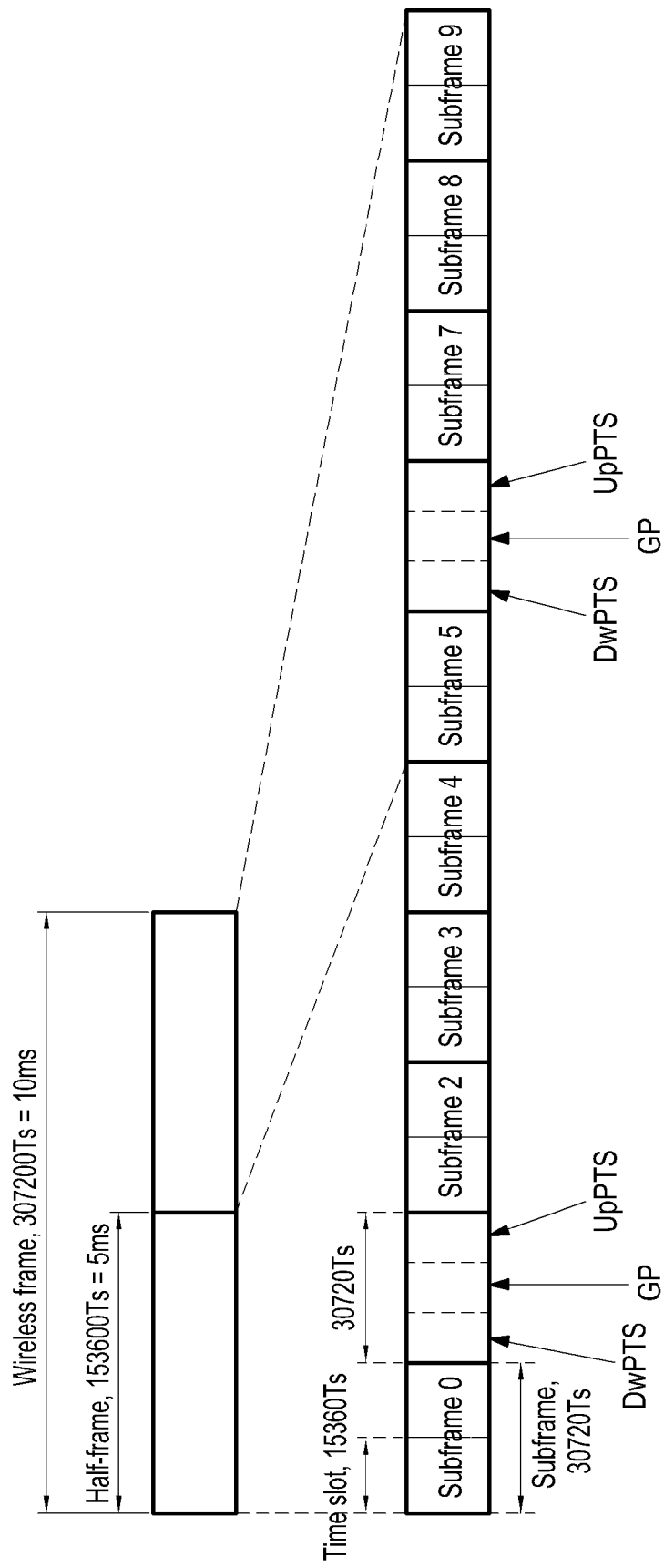
FIG. 1 illustrates a frame structure of a Time Division Duplex (TDD) system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

To facilitate the understanding of exemplary embodiments of the present invention, the timing relation of a Hybrid Automatic Repeat Request (HARQ) in a Carrier Aggregation (CA) scenario is briefly introduced. In a case of CA where uplink and downlink configurations of a plurality of Cells are different, there is such a structure where some Cells are uplink subframes while others are downlink subframes within the same subframe, and the structure causes the timing relation of HARQ of a Physical Downlink Control Channel (PDSCH) to change, thereby causing the change of the actual maximum number of downlink HARQ processes of each Cell. According to the timing relation of HARQ specifically used, the HARQ of a Primary cell (Pcell) may not change, i.e., the maximum number of downlink HARQ processes of Pcell does not change, but the timing relation of HARQ of a Secondary cell (Scell) changes. Accordingly, the maximum number of downlink HARQ processes of the Scell changes, or both of the timing relation of HARQ of the Pcell and the Scell change so as to cause the change of the maximum numbers of downlink HARQ processes of the Pcell and the Scell.

Such change of the maximum number of downlink HARQ processes is described through an example as follows. The timing relation of HARQ used in exemplary embodiments of the present invention is merely to explain that the maximum number of downlink HARQ processes of the Scell changes when uplink and downlink configurations of a plurality of Cells are different, but exemplary embodiments of the present invention are not limited to only using this method to define HARQ timing of the Scell.

FIGS. 2 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 2:
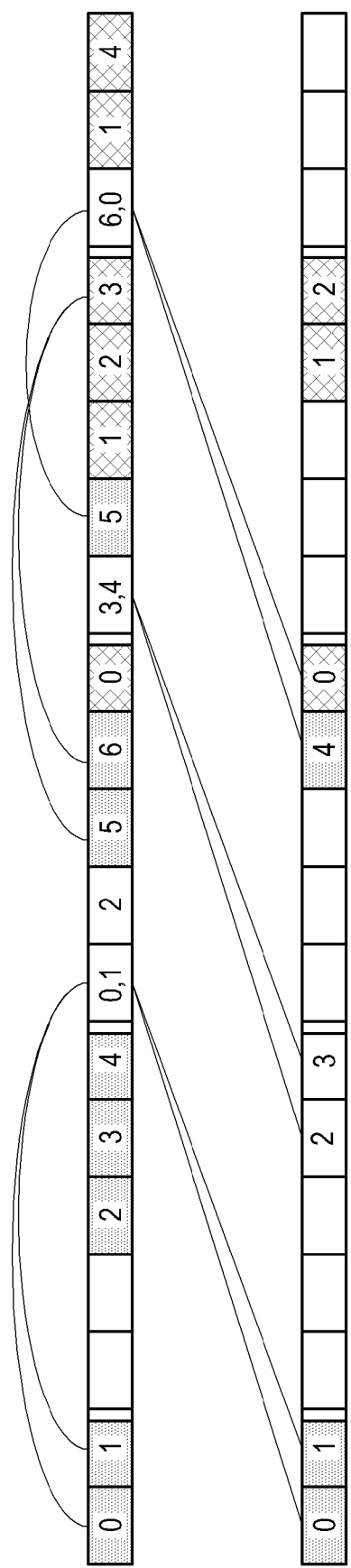
FIG. 2 illustrates a timing relation of a downlink Hybrid Automatic Repeat Request (HARQ) according to an exemplary embodiment of the present invention.

FIG. 2 illustrates a timing relation of a downlink HARQ according to an exemplary embodiment of the present invention.

Referring to FIG. 2, the uplink and downlink configurations of the Pcell and Scell are configuration 1 and configuration 0, respectively. Suppose uplink ACKnowledgement/Non-ACKnowledgement (ACK/NACK) information is still sent on the Pcell, the maximum number of downlink HARQ processes of the Scell equals to 5, while the maximum number of downlink HARQ processes of configuration 0 in a Long Term Evolution (LTE) Time Division Duplex (TDD) equals to 4, according to the timing relation of HARQ as shown in FIG. 2. Specifically, since the Pcell uses different uplink and downlink configurations than the Scell, the maximum number of downlink HARQ processes transmitted by the PDSCH on the Scell increases relative to the maximum number of downlink HARQ processes in LTE TDD.

Since the processing of the soft buffer by the base station and a User Equipment (UE) depends on the maximum number of downlink HARQ processes of a Cell, the change of the maximum number of downlink HARQ processes caused by different uplink and downlink configurations of multiple Cells affects the operation for the soft buffer by the base station and UE. According to the exemplary method for processing the soft buffer, as defined in Release 10 of LTE TDD, the maximum number of downlink HARQ processes serves as a parameter for computing the soft buffer allocated to each transport block.

According to an exemplary embodiment of the present invention, a method for soft buffer processing is provided. The method includes allocating, by a base station, transmission resources for a UE, and processing the soft buffer according to at least one parameter of the soft buffer when uplink and downlink configurations of a plurality of Cells of the UE CA are different, sending, by the base station, data to the UE by a Physical Downlink Control Channel (PDCCH) and the PDSCH, wherein the at least one parameter of the soft buffer is determined by at least one of a Pcell and a Scell uplink and downlink configurations of the UE, and performing rate matching on the PDSCH.

Figure 3:
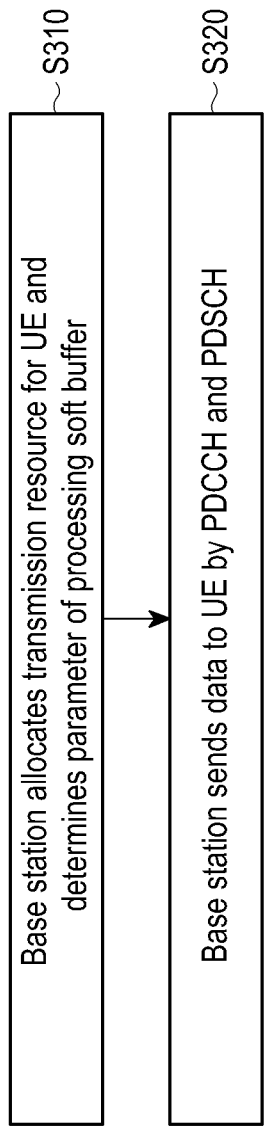
FIG. 3 is a flowchart illustrating a method of processing a soft buffer at a network side according to an exemplary embodiment of the present invention.

In consideration of the characteristics of the uplink and downlink configurations of a plurality of Cells being different, FIG. 3 is described below.

FIG. 3 is a flowchart illustrating a method for processing a soft buffer at a network side according to an exemplary embodiment of the present invention.

Referring to FIG. 3, in step S310, a base station allocates a transmission resource for a UE and determines a parameter of processing the soft buffer.

In step S310, the base station allocates the transmission resource for UE, and processes the soft buffer according to at least one parameter of the soft buffer when uplink and downlink configurations of a plurality of Cells of the UE CA are different, wherein the at least one parameter of the soft buffer is determined by at least one of the Pcell and the Scell uplink and downlink configurations of the UE, and thereafter rate matching is performed on the PDSCH.

In an exemplary embodiment of the present invention, a processing method is to determine the actual maximum number of downlink HARQ processes of one Cell according to the timing relation of HARQ defined in a case of CA where different uplink and downlink configurations are used in a plurality of Cells, so as to process soft buffer according to the actual maximum number of downlink HARQ processes. Specifically, according to each combination of uplink and downlink configurations of the Pcell and the Scell, the actual maximum number of downlink HARQ processes of one Cell is determined and the corresponding relationship between such combination of uplink and downlink configurations and the actual maximum number of downlink HARQ processes is recorded in the form of a table. For one combination of uplink and downlink configurations of the Pcell and the Scell, the actual maximum number of downlink HARQ processes of one Cell is described below.

Presume that for each combination of TDD uplink and downlink configurations of the Pcell and the Scell, the HARQ-ACK timing relation corresponding to downlink transmission on the Scell reuses the HARQ-ACK timing relation of a TDD uplink and downlink configurations. For example, the TDD uplink and downlink configurations for the HARQ-ACK timing relation of the downlink transmission of the Scell are determined in accordance with the corresponding relations in Table 4.

TABLE 4

TDD uplink and downlink configurations for HARQ-ACK timing relation

| HARQ-ACK timing of Scell | Uplink and downlink configurations of Pcell | | | | | | |
|---|---|---|---|---|---|---|---|
| | 0 | 1 | 2 | 3 | 4 | 5 | 6 |
| Uplink and downlink configurations of Scell | 0 | 1 | 2 | 3 | 4 | 5 | 6 |
| | 1 | 1 | 2 | 4 | 4 | 5 | 1 |
| | 2 | 2 | 2 | 5 | 5 | 5 | 2 |
| | 3 | 4 | 5 | 3 | 4 | 5 | 3 |
| | 4 | 4 | 5 | 4 | 4 | 5 | 4 |
| | 5 | 5 | 5 | 5 | 5 | 5 | 5 |
| | 6 | 1 | 2 | 3 | 4 | 5 | 6 |

As shown in Table 5, for each combination of TDD uplink and downlink configurations of the Pcell and the Scell, the actual maximum number real of downlink HARQ processes of the Scell is $M_{DL\_HARQ}^{real}$, and can be obtained by determining TDD uplink and downlink configurations for the HARQ-ACK timing relation of the Scell according to Table 4.

TABLE 5

Example I of the actual maximum number of downlink HARQ processes

| Uplink and downlink configurations of Pcell | Uplink and downlink configurations of Scell | TDD uplink and downlink configurations for the HARQ-ACK timing of the downlink transmission of Scell | Actual maximum number of downlink HARQ processes $M_{DL\_HARQ}^{real}$ |
|---|---|---|---|
| 0 | 0 | 0 | 4 |
| | 1 | 1 | 7 |
| | 2 | 2 | 10 |
| | 3 | 3 | 9 |

TABLE 5-continued

Example I of the actual maximum number of downlink HARQ processes

| Uplink and downlink configurations of Pcell | Uplink and downlink configurations of Scell | TDD uplink and downlink configurations for the HARQ-ACK timing of the downlink transmission of Scell | Actual maximum number of downlink HARQ processes $M_{DL\_HARQ}^{real}$ |
|---|---|---|---|
|   | 4 | 4 | 12 |
|   | 5 | 5 | 15 |
|   | 6 | 6 | 6 |
| 1 | 0 | 1 | 5 |
|   | 1 | 1 | 7 |
|   | 2 | 2 | 10 |
|   | 3 | 4 | 10 |
|   | 4 | 4 | 12 |
|   | 5 | 5 | 15 |
|   | 6 | 1 | 6 |
| 2 | 0 | 2 | 5 |
|   | 1 | 2 | 8 |
|   | 2 | 2 | 10 |
|   | 3 | 5 | 11 |
|   | 4 | 5 | 13 |
|   | 5 | 5 | 15 |
|   | 6 | 2 | 7 |
| 3 | 0 | 3 | 6 |
|   | 1 | 4 | 10 |
|   | 2 | 5 | 14 |
|   | 3 | 3 | 9 |
|   | 4 | 4 | 12 |
|   | 5 | 5 | 15 |
|   | 6 | 3 | 7 |
| 4 | 0 | 4 | 7 |
|   | 1 | 4 | 10 |
|   | 2 | 5 | 14 |
|   | 3 | 4 | 10 |
|   | 4 | 4 | 12 |
|   | 5 | 5 | 15 |
|   | 6 | 4 | 8 |
| 5 | 0 | 5 | 7 |
|   | 1 | 5 | 11 |
|   | 2 | 5 | 14 |
|   | 3 | 5 | 11 |
|   | 4 | 5 | 13 |
|   | 5 | 5 | 15 |
|   | 6 | 5 | 9 |
| 6 | 0 | 6 | 5 |
|   | 1 | 1 | 7 |
|   | 2 | 2 | 10 |
|   | 3 | 3 | 9 |
|   | 4 | 4 | 12 |
|   | 5 | 5 | 15 |
|   | 6 | 6 | 6 |

The actual maximum number of downlink HARQ processes of the Scell $M_{DL\_HARQ}^{real}$, as determined in Table 5, can be applied to various CA scenarios. Alternatively, $M_{DL\_HARQ}^{real}$ may be determined by using different methods when the downlink transmission of the Scell is cross-carrier scheduled through the PDCCH of the Pcell. Presume that cross-subframe scheduling is not supported, i.e., the PDCCH sent within one downlink subframe of the Pcell can only schedule the downlink data transmission of downlink sub-frames of the Scell on identical timing positions, and for each combination of TDD uplink and downlink configurations of the Pcell and the Scell, the HARQ-ACK timing relation corresponding to the downlink transmission on the Scell may reuse the HARQ-ACK timing relation of TDD uplink and downlink configurations of the Pcell. As shown in Table 6, for each combination of TDD uplink and downlink configurations of the Pcell and the Scell, the actual maximum number of downlink HARQ processes of the Scell is $M_{DL\_HARQ}^{real}$, and can be obtained by determining the HARQ-ACK timing relation of the Scell according to the uplink and downlink configurations of the Pcell.

TABLE 6

Example II of the actual maximum number of downlink HARQ processes $M_{DL\_HARQ}^{real}$

| Uplink and downlink configurations of Pcell | Uplink and downlink configurations of Scell | TDD uplink and downlink configurations for the HARQ-ACK timing of the downlink transmission of Scell | Actual maximum number of downlink HARQ processes $M_{DL\_HARQ}^{real}$ |
|---|---|---|---|
| 0 | 0 | 0 | 4 |
|   | 1 | 0 | 4 |
|   | 2 | 0 | 4 |
|   | 3 | 0 | 4 |
|   | 4 | 0 | 4 |
|   | 5 | 0 | 4 |
|   | 6 | 0 | 4 |
| 1 | 0 | 1 | 5 |
|   | 1 | 1 | 7 |
|   | 2 | 1 | 7 |
|   | 3 | 1 | 6 |
|   | 4 | 1 | 7 |
|   | 5 | 1 | 7 |
|   | 6 | 1 | 6 |
| 2 | 0 | 2 | 5 |
|   | 1 | 2 | 8 |
|   | 2 | 2 | 10 |
|   | 3 | 2 | 8 |
|   | 4 | 2 | 9 |
|   | 5 | 2 | 10 |
|   | 6 | 2 | 7 |
| 3 | 0 | 3 | 6 |
|   | 1 | 3 | 7 |
|   | 2 | 3 | 8 |
|   | 3 | 3 | 9 |
|   | 4 | 3 | 9 |
|   | 5 | 3 | 9 |
|   | 6 | 3 | 7 |
| 4 | 0 | 4 | 7 |
|   | 1 | 4 | 10 |
|   | 2 | 4 | 11 |
|   | 3 | 4 | 10 |
|   | 4 | 4 | 12 |
|   | 5 | 4 | 12 |
|   | 6 | 4 | 8 |
| 5 | 0 | 5 | 7 |
|   | 1 | 5 | 11 |
|   | 2 | 5 | 14 |
|   | 3 | 5 | 11 |
|   | 4 | 5 | 13 |
|   | 5 | 5 | 15 |
|   | 6 | 5 | 9 |
| 6 | 0 | 6 | 5 |
|   | 1 | 6 | 6 |
|   | 2 | 6 | 6 |
|   | 3 | 6 | 6 |
|   | 4 | 6 | 6 |
|   | 5 | 6 | 6 |
|   | 6 | 6 | 6 |

The actual maximum number of downlink HARQ processes $M_{DL\_HARQ}^{real}$ is used to compute the soft buffer allocated to each code block, based on the method for rate matching of the base station currently defined in Release 10 of LTE TDD. The size of the soft buffer of UE is described as $N_{soft}$, and the size of the soft buffer of code block is $$N_{cb} = \min\left(\left\lfloor \frac{N_{IR}}{C} \right\rfloor, K_w\right),$$

when the base station performs rate matching on each code block of one transport block, wherein $$N_{IR} = \left\lfloor \frac{N_{soft}}{K_C \cdot K_{MIMO} \cdot \min(M_{DL\_HARQ}^{real}, M_{limit})} \right\rfloor,$$

and other parameters are the same as those defined in Release 10 of LTE TDD. For example, C is a sum of the code blocks divided by the transport block, $K_{MIMO}$ depends on the transmission mode of UE, $K_{MIMO}=2$ for the Multiple-Input Multiple-Output (MIMO) transmission mode, $K_{MIMO}=1$ for the non-MIMO transmission mode, $M_{limit}$ is a constant 8, $K_c$ is a constant relating to UE category, and $K_w$ is a sum of encoding bits transmitted by turbo codes.

Corresponding to the operation of the base station, the UE may have a plurality of exemplary methods of processing the soft buffer. The exemplary method of the UE processing the soft buffer based on $M_{DL\_HARQ}^{real}$ is described below.

At the UE side, based on the exemplary method of processing the soft buffer by the UE, as defined in Release 10 of LTE TDD, the UE equally divides its soft buffer to a plurality of Cells, and for each Cell and at least $K_{MIMO}\cdot\min(M_{DL\_HARQ}^{real}, M_{limit})$ transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{real}, M_{limit})} \right\rfloor\right).$$

Specifically, these soft bits are described as $w_k$ $w_{k+1}, \ldots, w_{mod(k+n_{SB}-1, N_{cb})}$, $w_k$ being a soft bit received by the UE and k being a smaller index in the indexes of respective soft bits received by the UE.

The above processing method processes the soft buffer based on the actual maximum number of downlink HARQ processes $M_{DL\_HARQ}^{real}$, which has the optimal performance but high complexity. The actual maximum number of downlink HARQ processes of each configuration combination is recorded by means of a table. For example, seven uplink and downlink configurations are defined in LTE TDD, and in consideration of the base station supporting bandwidth combinations on two different frequency bands, there are 42 different combinations of uplink and downlink configurations, that is, there are 42 lines in this table. If a case of CA where uplink and downlink configurations on two frequency bands are substantially the same is considered, there are 49 lines in total in the table.

In another exemplary embodiment of the present invention, a simplified processing method is to process the soft buffer by the maximum number of downlink HARQ processes $M_{DL\_HARQ}^{R10,Scell}$, as defined by the up downlink configurations of the Scell in Release 10 of LTE TDD, in a case of CA where different uplink and downlink configurations are used in a plurality of Cells. Here, since the uplink and downlink configurations of respective Cells are different, $M_{DL\_HARQ}^{R10,Scell}$ is likely to be unequal to the actual maximum number of downlink HARQ processes $M_{DL\_HARQ}^{real}$. Thus, it is not optimal to process the soft buffer based on $M_{DL\_HARQ}^{R10,Scell}$.

Specifically, based on the exemplary method for rate matching of the base station currently defined in Release 10 of LTE TDD, the soft buffer allocated to each code block is computed by the maximum number of downlink HARQ processes $M_{DL\_HARQ}^{R10,Scell}$ defined by the uplink and downlink configurations of the Scell in Release 10 of LTE TDD. When the base station performs rate matching on each code block of one transport block, the size of the soft buffer of the code block is $$N_{cb} = \min\left(\left\lfloor \frac{N_{IR}}{C} \right\rfloor, K_w\right),$$

wherein $$N_{IR} = \left\lfloor \frac{N_{soft}}{K_C \cdot K_{MIMO} \cdot \min(M_{DL\_HARQ}^{R10,Scell}, M_{limit})} \right\rfloor,$$

and other parameters are the same as those defined in Release 10 of LTE TDD.

Corresponding to the operation of the base station, the UE may have a plurality of methods of processing the soft buffer. The exemplary method of the UE processing the soft buffer based on $M_{DL\_HARQ}^{R10,Pcell}$ is described as follows: at the UE side, the UE equally divides its soft buffer to a plurality of Cells, and for each Cell and at least $K_{MIMO}\cdot\min(M_{DL\_HARQ}^{R10,Scell}, M_{limit})$ transport blocks, when one code block of one transport block fails to decode, the base station supposes that the number of soft bits stored by the UE for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{R10,Scell}, M_{limit})} \right\rfloor\right),$$

wherein these soft bits are described as $w_k$ $w_{k+1}, \ldots, w_{mod(k+n_{SB}-1, N_{cb})}$, being a soft bit received by the UE, and k being a smaller index in the indexes of respective soft bits received by the UE. Here, when $M_{DL\_HARQ}^{real}$ is greater than $M_{DL\_HARQ}^{R10,Scell}$, the UE is likely to not have enough ability to store $n_{SB}$ soft bits for every code block.

An exemplary processing method is to process the soft buffer by the maximum number of downlink HARQ processes $M_{DL\_HARQ}^{R10,Pcell}$, as defined by the uplink and downlink configurations of the Pcell in Release 10 of LTE TDD, in a case of CA where different uplink and downlink configurations are used in a plurality of Cells. Here, since the uplink and downlink configurations of respective Cells are different, $M_{DL\_HARQ}^{R10,Pcell}$ is likely to be unequal to the actual maximum number of downlink HARQ processes $M_{DL\_HARQ}^{real}$. Thus it is not optimal to process the soft buffer based on $M_{DL\_HARQ}^{R10,Pcell}$.

Specifically, based on the exemplary method for rate matching of the base station currently defined in Release 10 of LTE TDD, the soft buffer allocated to each code block is computed by the maximum number of downlink HARQ processes $M_{DL\_HARQ}^{R10,Pcell}$, as defined by the uplink and downlink configurations of the Pcell in Release 10 of LTE TDD. When the base station performs rate matching on each code block of one transport block, the size of the soft buffer of the code block is $$N_{cb} = \min\left(\left\lfloor \frac{N_{IR}}{C} \right\rfloor, K_w\right),$$

wherein $$N_{IR} = \left\lfloor \frac{N_{soft}}{K_C \cdot K_{MIMO} \cdot \min\left(M_{DL\_HARQ}^{R10,Pcell}, M_{limit}\right)} \right\rfloor,$$

and other parameters are the same as those defined in Release 10 of LTE TDD.

Corresponding to the operation of the base station, the UE may have a plurality of methods of processing the soft buffer. The exemplary method of the UE processing the soft buffer based on $M_{DL\_HARQ}^{R10,Pcell}$ is described as follows: at the UE side, the UE equally divides its soft buffer to a plurality of Cells, and for each Cell and at least $K_{MIMO} \cdot \min(M_{DL\_HARQ}^{R10,Pcell}, M_{limit})$ transport blocks, when one code block of one transport block fails to decode, the base station supposes that the number of the soft buffer stored by the UE for this code block is $$n_{SB} = \min\left(N_{cb}, \left\lfloor \frac{N_{soft}}{C \cdot N_{cells}^{DL} \cdot K_{MIMO} \cdot \min\left(M_{DL\_HARQ}^{R10,Pcell}, M_{limit}\right)} \right\rfloor\right),$$

wherein these soft bits are described as $w_k, w_{k+1}, \ldots, w_{mod(k+n_{SB}-1, N_{cb})}$, $w_k$ being a soft bit received by the UE, and k being a smaller index in the indexes of respective soft bits received by the UE. Here, when $M_{DL\_HARQ}^{real}$ is greater than $M_{DL\_HARQ}^{R10,Pcell}$, the UE is likely to not have enough ability to store $n_{SB}$ soft bits for every code block. One advantage of this exemplary method is that it is compatible to the exemplary method for processing the soft buffer in Release 10 of LTE TDD.

Another exemplary processing method is to process the soft buffer by substituting a predefined value X to the maximum number of downlink HARQ processes in a case of CA where different uplink and downlink configurations are used to a plurality of Cells. This predefined value may be high-level semi-statically configured and may also be a fixed value in the standard. For example, a reasonable method is that the predefined value X equals to 8. For Frequency Division Duplexing (FDD), the maximum number of downlink HARQ processes is fixed to 8, so the soft buffer is processed based on X being equal to 8, and its downlink performance corresponding to the FDD system.

Specifically, based on the exemplary method for rate matching of the base station currently defined in Release 10 of LTE TDD, the soft buffer allocated to each code block is computed by the predefined value X. When the base station performs rate matching on each code block of one transport block, the size of the soft buffer of code block is $$N_{cb} = \min\left(\left\lfloor \frac{N_{IR}}{C} \right\rfloor, K_w\right),$$

wherein $$N_{IR} = \left\lfloor \frac{N_{soft}}{K_C \cdot K_{MIMO} \cdot \min(X, M_{limit})} \right\rfloor,$$

and other parameters are the same as those defined in Release 10 of LTE TDD.

Corresponding to the operation of the base station, the UE may have a plurality of methods of processing the soft buffer. The exemplary method of the UE processing the soft buffer based on X is described as follows: at the UE side, the UE equally divides its soft buffer to a plurality of Cells, and for each Cell and at least $K_{MIMO} \cdot \min(X, M_{limit})$ transport blocks, when one code block of one transport block fails to decode, the number of the soft buffer stored at least for this code block is $$n_{SB} = \min\left(N_{cb}, \left\lfloor \frac{N_{soft}}{C \cdot N_{cells}^{DL} \cdot K_{MIMO} \cdot \min(X, M_{limit})} \right\rfloor\right).$$

Specifically, these soft bits are described as $w_k, w_{k+1}, \ldots, w_{mod(k+n_{SB}-1, N_{cb})}$, being a soft bit received by the UE, and k being a smaller index in the indexes of respective soft bits received by the UE. By implementing this exemplary method, the base station can ensure that the UE stores $n_{SB}$ soft bits for one code block, so that it can optimize the operation of HARQ Incremental Redundancy (IR).

In a case of CA where different uplink and downlink configurations are used in a plurality of Cells, depending on the defined timing relation of HARQ, it is likely to enable the actual maximum number of downlink HARQ processes $M_{DL\_HARQ}^{real}$ of one Cell to be within the range determined by the maximum number of downlink HARQ processes $M_{DL\_HARQ}^{R10,Pcell}$ and $M_{DL\_R10,Scell}$ of respective uplink and downlink configurations of the Pcell and the Scell in Release 8 of LTE TDD, i.e., $M_{DL\_HARQ}^{real}$ is greater than or equal to the smaller value between $M_{DL\_HARQ}^{R10,Pcell}$ and $M_{DL\_HARQ}^{R10,Scell}$ and less than or equal to the greater value between $M_{DL\_HARQ}^{R10,Pcell}$ and $M_{DL\_HARQ}^{R10,Scell}$. Moreover, it is possible to ensure that $M_{DL\_HARQ}^{real}$ is within the range determined by $M_{DL\_HARQ}^{R10,Pcell}$ and $M_{DL\_HARQ}^{R10,Scell}$ through an appropriate design of HARQ timing.

Therefore, a simplified exemplary processing method is to process the soft buffer by the greater value of the maximum number of downlink HARQ processes of respective uplink and downlink configurations of the Pcell and the Scell, as defined in Release 8 of LTE TDD, i.e., max$(M_{DL\_HARQ}^{R10,Pcell}, M_{DL\_HARQ}^{R10,Scell})$.

Specifically, based on the exemplary method for rate matching of the base station currently defined in Release 10 of LTE TDD, the soft buffer allocated to each code block is computed by max$(M_{DL\_HARQ}^{R10,Pcell}, M_{DL\_HARQ}^{R10,Scell})$. When the base station performs rate matching on each code block of one transport block, the size of the soft buffer of code block is $$N_{cb} = \min\left(\left\lfloor \frac{N_{IR}}{C} \right\rfloor, K_w\right),$$

wherein $$N_{IR} = \left\lfloor \frac{N_{soft}}{K_C \cdot K_{MIMO} \cdot \min\left(\max\left(M_{DL\_HARQ}^{R10,Pcell}, M_{DL\_HARQ}^{R10,Scell}\right), M_{limit}\right)} \right\rfloor,$$

and other parameters are the same as those defined in Release 10 of LTE TDD.

Corresponding to the operation of the base station, the UE may have a plurality of methods of processing the soft buffer. The exemplary method of the UE processing the soft buffer based on max ($M_{DL\_HARQ}^{R10,Pcell}$, $M_{DL\_HARQ}^{R10,Scell}$) is described as follows: at the UE side, the UE equally divides its soft buffer to a plurality of Cells, and for each Cell and for at least $K_{MIMO}$·min(max ($M_{DL\_HARQ}^{R10,Pcell}$, $M_{DL\_HARQ}^{R10,Scell}$), $M_{limit}$) transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(\max(M_{DL\_HARQ}^{R10,Pcell}, M_{DL\_HARQ}^{R10,Scell}), M_{limit})} \right\rfloor\right).$$

Specifically, these soft bits are described as $w_k$, $w_{k+1}, \ldots, w_{mod(k+n_{SB}-1, N_{cb})}$, $w_k$ being a soft bit received by the UE, and k being a smaller index in the indexes of respective soft bits received by the UE. By implementing this exemplary method, the base station can ensure that the UE stores $n_{SB}$ soft bits for one transport block, so that it can optimize the operation of HARQ IR.

In a case of CA where different uplink and downlink configurations are used in a plurality of Cells, one exemplary method for defining HARQ-ACK timing is that timing relation of HARQ-ACK corresponding to downlink transmission on the Scell reuse the HARQ-ACK timing relation of a TDD uplink and downlink configurations for each combination of TDD uplink and downlink configurations of the Pcell and the Scell, for example, working according to Table 4. Specifically, in a case where the downlink subframe of the Scell is a subset of downlink subframes of the Pcell, the HARQ-ACK timing relation corresponding to the downlink transmission on the Scell is determined according to the timing relation of TDD uplink and downlink configurations of the Pcell. In a case where the downlink subframe of the Scell is a superset of downlink subframes of the Pcell, the HARQ-ACK timing relation corresponding to the downlink transmission on the Scell is determined according to the timing relation of TDD uplink and downlink configurations of the Scell itself. In a case where the downlink subframe of the Scell is neither the subset of downlink subframes of the Pcell nor the superset of downlink subframes of the Pcell, the HARQ-ACK timing relation corresponding to the downlink transmission on the Scell is determined according to the timing relation of a reference TDD uplink and downlink configuration, wherein the uplink subframe in this reference TDD uplink and downlink configuration is the intersection of the uplink subframe of the Pcell and the uplink subframe of the Scell. In order to facilitate depiction, TDD uplink and downlink configurations for determining HARQ-ACK timing relation of downlink transmission of the Scell as defined by each combination of TDD uplink and downlink configurations of the Pcell and the Scell in Table 4 are collectively referred to as TDD uplink and downlink configurations for HARQ-ACK timing relation.

In an exemplary method for defining HARQ-ACK timing relation, according to the LTE TDD specification, the maximum number of downlink HARQ processes of TDD uplink and downlink configurations for determining HARQ-ACK timing relation is $M_{DL\_HARQ}^{ref}$. Another exemplary processing method, in a case of CA where different uplink and downlink configurations are used in a plurality of Cells, is to process the soft buffer by the maximum number of downlink HARQ processes of TDD uplink and downlink configurations for determining HARQ-ACK timing relation, i.e., $M_{DL\_HARQ}^{ref}$.

Specifically, based on the exemplary method for rate matching of the base station currently defined in Release 10 of LTE TDD, the soft buffer allocated to each code block is computed by $M_{DL\_HARQ}^{ref}$. When the base station performs rate matching on each code block of one transport block, the size of the soft buffer of code block is $$N_{cb} = \min\left(\left\lfloor \frac{N_{IR}}{C} \right\rfloor, K_w\right),$$

wherein $$N_{IR} = \left\lfloor \frac{N_{soft}}{K_C \cdot K_{MIMO} \cdot \min(M_{DL\_HARQ}^{ref}, M_{limit})} \right\rfloor,$$

other parameters are the same as those defined in Release 10 of LTE TDD.

Corresponding to the operation of the base station, the UE may have a plurality of methods of processing the soft buffer. The exemplary method of the UE processing the soft buffer based on $M_{DL\_HARQ}^{ref}$ is described as follows: at the UE side, the UE equally divides its soft buffer to a plurality of Cells, and for each Cell and for at least $K_{MIMO}$·min ($M_{DL\_HARQ}^{ref}$, $M_{limit}$) transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{ref}, M_{limit})} \right\rfloor\right).$$

Specifically, these soft bits are described as $w_k$, $w_{k+1}, \ldots, w_{mod(k+n_{SB}-1, N_{cb})}$, $w_k$ being a soft bit received by the UE, and k being a smaller index in the indexes of respective soft bits received by the UE. By implementing this exemplary method, the base station can ensure that the UE stores $n_{SB}$ soft bits for one code block, so that it can optimize the operation of HARQ IR.

According to the LTE TDD specification, the maximum number of downlink HARQ processes of TDD uplink and downlink configurations for determining HARQ-ACK timing relation is $M_{DL\_HARQ}^{ref}$, and $M_{DL\_HARQ}^{ref}$ is used to process the soft buffer in a case of CA where different uplink and downlink configurations are used in a plurality of Cells.

Taking the exemplary method of TDD uplink and downlink configurations for determining HARQ-ACK timing relation in Table 4 as an example, in a case where the downlink subframe of the Scell is a superset of downlink subframes of the Pcell, the TDD uplink and downlink configurations for determining HARQ-ACK timing relation is the TDD uplink and downlink configurations of the Scell, so $M_{DL\_HARQ}^{ref}$ equals to the actual maximum number of downlink HARQ processes $M_{DL\_HARQ}^{real}$ of the Scell, i.e., the actual maximum number of downlink HARQ processes $M_{DL\_HARQ}^{Scell,R10}$, as defined in Release 10 of LTE. In a case where the downlink subframe of the Scell is a subset of downlink subframes of the Pcell, and that the downlink subframe of the Scell is neither the subset of nor the superset of downlink subframes of the Pcell, the uplink and downlink configurations of TDD for determining HARQ-ACK timing relation is different with the uplink and downlink configurations of the Scell, so $M_{DL\_HARQ}^{ref}$ does not equal to the actual maximum number of downlink HARQ processes $M_{DL\_HARQ}^{real}$ of the Scell, and renders a certain performance loss.

Similarly, for cross-carrier scheduling, the HARQ-ACK timing relation of downlink transmission of the Scell is normally determined according to the uplink and downlink timing relation of the Pcell. As shown in Table 5, in a case where the downlink subframe of the Scell is a superset of downlink subframes of the Pcell, downlink subframes available for downlink transmission on the Scell are identical with those on the Pcell, whereby $M_{DL\_HARQ}^{ref}$ obtained according to uplink and downlink configurations of the Pcell equals to the actual maximum number of downlink HARQ processes $M_{DL\_HARQ}^{real}$ of downlink transmission on the Scell. In a case where the downlink subframe of the Scell is a subset of downlink subframes of the Pcell, and that the downlink subframe of the Scell is neither the subset of nor the superset of downlink subframes of the Pcell, downlink subframes available for downlink transmission on the Scell are different with those on the Pcell, resulting in that the parameter $M_{DL\_HARQ}^{ref}$ determined by HARQ-ACK timing relation of the Pcell being different with the actual maximum number of downlink HARQ processes $M_{DL\_HARQ}^{real}$ of the Scell, and rendering a certain performance loss.

One processing exemplary method is obtaining the parameter $M_{DL\_HARQ}^{max}$ for processing the soft buffer by calculation based on the maximum number of downlink HARQ processes $M_{DL\_HARQ}^{ref}$ of TDD uplink and downlink configurations for determining HARQ-ACK timing relation, and processing the soft buffer based on the parameter $M_{DL\_HARQ}^{max}$. Comparing the maximum number of downlink HARQ processes $M_{DL\_HARQ}^{ref}$ of TDD uplink and downlink configurations for determining HARQ-ACK timing relation and the actual maximum number of downlink HARQ processes $M_{DL\_HARQ}^{real}$ of the Scell of Table 4 or Table 5, in a case where the downlink subframe of the Scell is a superset of downlink subframes of the Pcell, $M_{DL\_HARQ}^{max}$ equals to $M_{DL\_HARQ}^{ref}$. In a case where the downlink subframe of the Scell is a subset of downlink subframes of the Pcell and that the downlink subframe of the Scell is neither the subset of nor the superset of downlink subframes of the Pcell, $M_{DL\_HARQ}^{real}$ is less than $M_{DL\_HARQ}^{ref}$ by at least one, so $M_{DL\_HARQ}^{max}$ can be defined as equaling to $M_{DL\_HARQ}^{ref}-1$.

Thus, the parameter $M_{DL\_HARQ}^{max}$ obtained by the calculation hereinabove is used to compute the soft buffer allocated to each code block, based on the exemplary method for rate matching of the base station currently defined in Release 10 of LTE TDD. The size of the soft buffer of code block is $$N_{cb} = \min\left(\left\lfloor\frac{N_{IR}}{C}\right\rfloor, K_w\right),$$

when the base station performs rate matching on each code block of one transport block, wherein $$N_{IR} = \left\lfloor\frac{N_{soft}}{K_C \cdot K_{MIMO} \cdot \min(M_{DL\_HARQ}^{real}, M_{limit})}\right\rfloor,$$

and other parameters are the same as those defined in Release 10 of LTE TDD.

Corresponding to the operation of the base station, the UE may have a plurality of methods for processing the soft buffer. The exemplary method of the UE processing the soft buffer based on $M_{DL\_HARQ}^{max}$ is described as follows: at the UE side, the UE equally divides its soft buffer to a plurality of Cells, and for each Cell and at least $K_{MIMO}\cdot\min(M_{DL\_HARQ}^{max}, M_{limit})$ transport blocks, when one code block of one transport block fails to decode, the number of soft bits stored at least for this code block is $$n_{SB} = \min\left(N_{cb}, \left\lfloor\frac{N_{soft}}{C \cdot N_{cells}^{DL} \cdot K_{MIMO} \cdot \min(M_{DL\_HARQ}^{max}, M_{limit})}\right\rfloor\right).$$

Specifically, these soft bits are described as $w_k, w_{k+1}, \ldots, w_{mod(k+n_{SB}-1, N_{cb})}$, $w_k$ being a soft bit received by the UE and k being a smaller index in the indexes of respective soft bits received by the UE. By implementing this exemplary method, the base station can ensure that the UE stores $n_{SB}$ soft bits for one code block, so that it can optimize the operation of HARQ IR.

In another exemplary processing method, in Release 10 of LTE TDD, the parameter used for processing the soft buffer is the smaller value of the maximum number of downlink HARQ processes $M_{DL\_HARQ}$ of cell and constant $M_{limit}$ (equivalent to 8 constantly), i.e., $\min(M_{DL\_HARQ}, M_{limit})$. Thus, in respect to the above exemplary method of processing the soft buffer based on the maximum number of downlink HARQ processes $M_{DL\_HARQ}^{ref}$ of TDD uplink and downlink configurations for determining HARQ-ACK timing relation, another exemplary method for improving performance is modifying the parameter $M_{limit}$ to approach the actual maximum number of downlink HARQ processes $M_{DL\_HARQ}^{real}$ as close as possible. The cap parameter of the maximum number of downlink HARQ processes after modification is described as $M_{limit}^{ref}$.

Comparing the maximum number of downlink HARQ processes $M_{DL\_HARQ}^{ref}$ of TDD uplink and downlink configurations for determining HARQ-ACK timing relation and the actual maximum number of downlink HARQ processes $M_{DL\_HARQ}^{real}$ of the Scell of Table 4 or Table 5, in a case where the downlink subframe of the Scell is a superset of downlink subframes of the Pcell, $M_{DL\_HARQ}^{ref}$ equals to $M_{DL\_HARQ}^{real}$, so the value of $M_{limit}$ in Release 10 of LTE can be kept unvaried, i.e., still setting $M_{limit}^{ref}=M_{limit}=8$. The cases where downlink subframe of the Scell is a subset of downlink subframes of the Pcell and where the downlink subframe of the Scell is neither the subset of nor the superset of downlink subframes of the Pcell are further treated respectively based on the uplink and downlink configurations of the Scell. Specifically, when the uplink and downlink configurations of the Scell is 1, 2, 3, 4 or 5, the actual maximum number of downlink HARQ processes $M_{DL\_HARQ}^{real}$ of the Scell for determining HARQ-ACK timing relation in Table 4 or 5 are both larger than or equivalent to 8, so $M_{limit}^{ref}=M_{limit}=8$ can still be set. When the uplink and downlink configurations of limit the Scell is 0 or 6, the actual maximum number of downlink HARQ processes $M_{DL\_HARQ}^{real}$ of the Scell for determining HARQ-ACK timing relation in Table 4 or 5 are both less than or equivalent to 7, so $M_{limit}^{ref}=7$ can be set.

Thus, $M_{DL\_HARQ}^{ref}$ and $M_{limit}^{ref}$ determined according to different situations hereinabove are used to compute the soft buffer allocated to each code block, based on the exemplary method for rate matching of the base station currently defined in Release 10 of LTE TDD. The size of the soft buffer of code block is $$N_{cb} = \min\left(\left\lfloor \frac{N_{IR}}{C} \right\rfloor, K_w\right)$$

when the base station performs rate matching on each code block of one transport block, wherein $$N_{IR} = \left\lfloor \frac{N_{soft}}{K_C \cdot K_{MIMO} \cdot \min(M_{DL\_HARQ}^{ref}, M_{limit}^{ref})} \right\rfloor,$$

and other parameters are the same as those defined in Release 10 of LTE TDD.

Corresponding to the operation of the base station, the UE may have a plurality of methods for processing the soft buffer. The exemplary method of the UE processing the soft buffer based on $M_{DL\_HARQ}^{ref}$ and $M_{limit}^{ref}$ determined according to different situations hereinabove is described as follows: at the UE side, the UE equally divides its soft buffer to a plurality of Cells, and for each Cell and at least $K_{MIMO} \cdot \min(M_{DL\_HARQ}^{ref}, M_{limit}^{ref})$ transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{ref}, M_{limit}^{ref})} \right\rfloor\right).$$

Specifically, these soft bits are described as $w_k$ $w_{k+1}$, ..., $w_{mod(k+n_{SB}-1, N_{cb})}$, $w_k$ being a soft bit received by the UE and k being a smaller index in the indexes of respective soft bits received by the UE. By implementing this exemplary method, the base station can ensure that the UE stores $n_{SB}$ soft bits for one code block, so that it can optimize the operation of HARQ IR.

In combination with the above two exemplary methods, on one hand, the parameter $M_{DL\_HARQ}^{max}$ is obtained by calculation based on the maximum number of downlink HARQ processes $M_{DL\_HARQ}^{ref}$ of TDD uplink and downlink configurations for determining HARQ-ACK timing relation in table 4 or table 5. On the other hand, the modified parameter $M_{limit}$ is obtained based on the TDD uplink and downlink configurations for determining HARQ-ACK timing relation in table 4 or table 5, and consequently, $M_{DL\_HARQ}^{max}$ and $M_{limit}^{ref}$ are used to process the soft buffer.

Thus, $M_{DL\_HARQ}^{max}$ and $M_{limit}^{ref}$ determined according to different situations hereinabove are used to compute the soft buffer allocated to each code block, based on the exemplary method for rate matching of the base station currently defined in Release 10 of LTE TDD. The size of the soft buffer of code block is $$N_{cb} = \min\left(\left\lfloor \frac{N_{IR}}{C} \right\rfloor, K_w\right)$$

when the base station performs rate matching on each code block of one transport block, wherein $$N_{IR} = \left\lfloor \frac{N_{soft}}{K_C \cdot K_{MIMO} \cdot \min(M_{DL\_HARQ}^{max}, M_{limit}^{ref})} \right\rfloor,$$

and other parameters are the same as those defined in Release 10 of LTE TDD.

Corresponding to the operation of the base station, the UE may have a plurality of exemplary methods for processing the soft buffer. The exemplary method of the UE processing the soft buffer based on $M_{DL\_HARQ}^{max}$ and $M_{limit}^{ref}$ determined according to different situations hereinabove is described as follows: at the UE side, the UE equally divides its soft buffer to a plurality of Cells, and for each Cell and at least $K_{MIMO} \cdot \min(M_{DL\_HARQ}^{max}, M_{limit}^{ref})$ transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{max}, M_{limit}^{ref})} \right\rfloor\right).$$

Specifically, these soft bits are described as $w_k$ $w_{k+1}$, ..., $w_{mod(k+n_{SB}-1, N_{cb})}$, $w_k$ being a soft bit received by the UE and k being a smaller index in the indexes of respective soft bits received by the UE. By implementing this exemplary method, the base station can ensure that the UE stores $n_{SB}$ soft bits for one code block, so that it can optimize the operation of HARQ IR.

It shall be interpreted that when the base station processes the soft real R10,Scell R10,Pcell buffer based on any one of the parameters $M_{DL\_HARQ}^{real}$, $M_{DL\_HARQ}^{R10,Scell}$, $M_{DL\_HARQ}^{R10,Pcell}$, X, $\max(M_{DL\_HARQ}^{R10,Pcell}$, $M_{DL\_HARQ}^{R10,Scell})$, $M_{DL\_HARQ}^{max}$, $M_{limit}^{ref}$, and $M_{DL\_HARQ}^{ref}$, the UE can select the ways based on any one of these parameters to process the soft buffer. The above one-to-one examples are only presented for illustrating exemplary embodiments of the present invention, and in practical use, the combinations of preceding ways may be selected and matched in any way per specific requirements. If the base station and the UE adopt the same parameter to process the soft buffer, the consistency of operations can be maintained. However, if the base station and the UE adopt different parameters to process the soft buffer, it will be favorable to optimize under different conditions.

In step S320, the base station sends data to the UE by the PDCCH and the PDSCH.

Thereafter, the UE receives the PDSCH sent by the base station, and determines the parameter of processing the soft buffer based on the uplink and downlink configurations of the Pcell and the Scell and accordingly performs the soft buffer for soft bits of the PDSCH when the determining of the PDSCH decoding fails.

Corresponding to the exemplary method at the network side, an exemplary method for processing the soft buffer at the side of terminal user is set. The exemplary method includes receiving, by a UE, transmission resource information that the base station allocates for it, and processing the soft buffer according to parameter of the soft buffer when the uplink and downlink configurations of a plurality of Cells of the UE CA are different, wherein the parameter of the soft buffer is determined by the Pcell and/or the Scell uplink and downlink configurations of the UE, and the UE receiving the PDCCH and the PDSCH sent by the base station according to the transmission resource and the parameter of processing the soft buffer.

Figure 4:
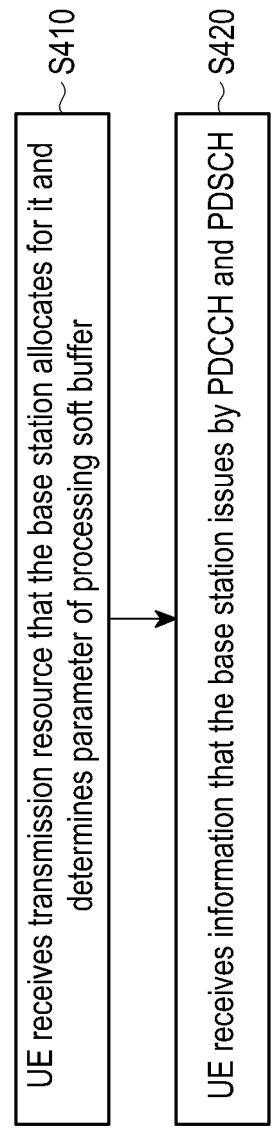
FIG. 4 is a flowchart illustrating a method of processing a soft buffer at a terminal side according to an exemplary embodiment of the present invention.

FIG. 4 is a flowchart illustrating a method for processing a soft buffer at a terminal side according to an exemplary embodiment of the present invention.

Referring to FIG. 4, in step S410, the UE receives transmission resource information that the base station allocates for it and determines the parameter of processing the soft buffer.

In another exemplary embodiment of the present invention, a processing method is to determine the actual maximum number of downlink HARQ processes of one Cell according to the timing relation of HARQ defined in a case of CA where different uplink and downlink configurations are used in a plurality of Cells so as to process the soft buffer according to the actual maximum number of downlink HARQ processes. Specifically, according to each combination of uplink and downlink configurations of the Pcell and the Scell, the actual maximum number of downlink HARQ processes of one Cell is determined and the corresponding relationship between such combination of uplink and downlink configurations and the actual maximum number of downlink HARQ processes is recorded in the form of a table. For one combination of uplink and downlink configurations of the Pcell and the Scell, the actual maximum number of downlink HARQ processes of one Cell is described as $M_{DL\_HARQ}^{real}$.

The base station may have a plurality of methods of processing the soft buffer. The exemplary method of a base station processing the soft buffer based on $M_{DL\_HARQ}^{real}$ is described as follows: the actual maximum number of downlink HARQ processes $M_{DL\_HARQ}^{real}$ is used to compute the soft buffer allocated to each code block, based on the exemplary method for rate matching of the base station currently defined in Release 10 of LTE TDD. The size of the soft buffer of the UE is described as $N_{soft}$, and the size of the soft buffer of code block is $$N_{cb} = \min\left(\left\lfloor \frac{N_{IR}}{C} \right\rfloor, K_w\right)$$

when the base station performs rate matching on each code block of one transport block, wherein $$N_{IR} = \left\lfloor \frac{N_{soft}}{K_C \cdot K_{MIMO} \cdot \min(M_{DL\_HARQ}^{real}, M_{limit})} \right\rfloor,$$

and other parameters are the same as those defined in Release 10 of LTE TDD, i.e., C is a sum of the code blocks divided by the transport block, $K_{MIMO}$ depends on the transmission mode of UE, $K_{MIMO}=2$ for the MIMO transmission mode, $K_{MIMO}=1$ for the non-MIMO transmission mode, $M_{limit}$ is a constant 8, $K_c$ is a constant relating to the UE category, and $K_w$ is a sum of encoding bits transmitted by turbo codes.

At the UE side, based on the exemplary method of processing the soft buffer by the UE, as defined in Release 10 of LTE TDD, the UE equally divides its soft buffer to a plurality of Cells, and for each Cell and at least $K_{MIMO}\cdot\min(M_{DL\_HARQ}^{real}, M_{limit})$ transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{real}, M_{limit})} \right\rfloor\right).$$

Specifically, these soft bits are described as $w_k, w_{k+1}, \ldots, w_{mod(k+n_{SB}-1, N_{cb})}$, $w_k$ being a soft bit received by the UE, and k being a smaller index in the indexes of respective soft bits received the by UE.

The above processing exemplary method processes the soft buffer based on the actual maximum number of downlink HARQ processes $M_{DL\_HARQ}^{real}$, which has the optimal performance but high complexity. It needs to record the actual maximum number of downlink HARQ processes of each configuration combination by means of a table. For example, seven different uplink and downlink configurations are defined in LTE TDD, and in consideration of the base station supporting bandwidth combinations on two different frequency bands, there are 42 different combinations of uplink and downlink configurations, that is, there are 42 lines in this table. In a case of CA where uplink and downlink configurations on two frequency bands are substantially the same is considered, there are 49 lines in total in the table.

In another exemplary embodiment of the present invention, a simplified processing exemplary method is to process the soft buffer by the maximum number of downlink HARQ processes $M_{DL\_HARQ}^{R10,Scell}$, as defined by the uplink and downlink configurations of the Scell in Release 10 of LTE TDD, in a case of CA where different uplink and downlink configurations are used in a plurality of Cells. Here, since the uplink and downlink configurations of respective Cells are different, $M_{DL\_HARQ}^{R10,Scell}$ is likely to be unequeal to the actual maximum number of downlink HARQ processes $M_{DL\_HARQ}^{real}$. Thus, it is not optimal to process the soft buffer based on $M_{DL\_HARQ}^{R10,Scell}$.

The base station may have a plurality of methods of processing the soft buffer. The exemplary method of a base station processing the soft buffer based on $M_{DL\_HARQ}^{R10,Scell}$ is described as follows: specifically, based on the exemplary method for rate matching of the base station currently defined in Release 10 of LTE TDD, the soft buffer allocated to each code block is computed by the maximum number of downlink HARQ processes $M_{DL\_HARQ}^{R10,Scell}$ of the uplink and downlink configurations of the Scell, as defined in Release 10 of LTE TDD. When the base station performs rate matching on each code block of one transport block, the size of the soft buffer of the code block is $$N_{cb} = \min\left(\left\lfloor \frac{N_{IR}}{C} \right\rfloor, K_w\right),$$

wherein, $$N_{IR} = \left\lfloor \frac{N_{soft}}{K_C \cdot K_{MIMO} \cdot \min(M_{DL\_HARQ}^{R10,Scell}, M_{limit})} \right\rfloor,$$

and other parameters are the same as those defined in Release 10 of LTE TDD.

At the UE side, the UE equally divides its soft buffer to a plurality of Cells, and for each Cell and at least $K_{MIMO}\cdot\min(M_{DL\_HARQ}^{R10,Scell}, M_{limit})$ transport blocks, when one code block of one transport block fails to decode, the base station supposes that the number of soft bits stored by the UE for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{R10,Scell}, M_{limit})} \right\rfloor\right),$$

wherein these soft bits are described as $w_k$ $w_{k+1}, \ldots,$ $w_{mod(k+n_{SB}-1, N_{cb})}$, $w_k$ being a soft bit received by the UE, and k being a smaller index in the indexes of respective soft bits received by the UE. Here, when $M_{DL\_HARQ}^{real}$ is greater than $M_{DL\_HARQ}^{R10,Scell}$, the UE is likely to not have enough ability to store $n_{SB}$ soft bits for very code block.

Another exemplary processing method is to process the soft buffer by the maximum number of downlink HARQ processes $M_{DL\_HARQ}^{R10,Pcell}$, as defined by the uplink and downlink configurations of the Pcell in Release 10 of LTE TDD, in a case of CA where different uplink and downlink configurations are used in a plurality of Cells. Here, since the uplink and downlink configurations of respective Cells are different, $M_{DL\_HARQ}^{R10,Pcell}$ is likely to be unequal to the actual maximum number of downlink HARQ processes $M_{DL\_HARQ}^{real}$. Thus it is not optimal to process the soft buffer based on $M_{DL\_HARQ}^{R10,Pcell}$.

The base station may have a plurality of exemplary methods of processing the soft buffer. The exemplary method of a base station processing the soft buffer based on $M_{DL\_HARQ}^{R10,Pcell}$ is described as follows: specifically, based on the exemplary method for rate matching of the base station currently defined in Release 10 of LTE TDD, the soft buffer allocated to each code block is computed by the maximum number of downlink HARQ processes $M_{DL\_HARQ}^{R10,Pcell}$ defined by the uplink and downlink configurations of the Pcell in Release 10 of LTE TDD. When the base station performs rate matching on each code block of one transport block, the size of the soft buffer of the code block is $$N_{cb} = \min\left(\left\lfloor \frac{N_{IR}}{C} \right\rfloor, K_w\right),$$

wherein $$N_{IR} = \left\lfloor \frac{N_{soft}}{K_C \cdot K_{MIMO} \cdot \min(M_{DL\_HARQ}^{R10,Pcell}, M_{limit})} \right\rfloor,$$

and other parameters are the same as those defined in Release 10 of LTE T.

At the UE side, the UE equally divides its soft buffer to a plurality of Cells, and for each Cell and at least $K_{MIMO} \cdot \min(M_{DL\_HARQ}^{R10,Pcell}, M_{limit})$ transport blocks, when one code block of one transport block fails to decode, the base station supposes that the number of the soft buffer stored by the UE for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{R10,Pcell}, M_{limit})} \right\rfloor\right),$$

wherein these soft bits are described as $w_k$ $w_{k+1}, \ldots,$ $w_{mod(k+n_{SB}-1, N_{cb})}$, $w_k$ being a soft bit received by the UE, and k being a smaller index in the indexes of respective soft bits received by the UE. Here, when $M_{DL\_HARQ}^{real}$ is greater than $M_{DL\_HARQ}^{R10,Pcell}$, the UE is likely to not have enough ability to store $n_{SB}$ soft bits for every code block. One advantage of this exemplary method is that it is compatible to the exemplary method for processing the soft buffer in Release 10 of LTE TDD.

Another exemplary processing method is to process the soft buffer by substituting a predefined value X to the maximum number of downlink HARQ processes in a case of CA where different uplink and downlink configurations are used to a plurality of Cells. This predefined value may be high-level semi-statically configured and may be a fixed value in the standard. For example, a reasonable exemplary method is that the predefined value X equals to 8. For FDD, the maximum number of downlink HARQ processes is fixed to 8, so the soft buffer is processed based on X being equal to 8, and its downlink performance corresponding to the FDD system.

The base station may have a plurality of methods of processing the soft buffer. The exemplary method of a base station processing the soft buffer based on X is described as follows: specifically, based on the exemplary method for rate matching of the base station currently defined in Release 10 of LTE TDD, the soft buffer allocated to each code block is computed by the predefined value X. When the base station performs rate matching on each code block of one transport block, the size of the soft buffer of code block is $$N_{cb} = \min\left(\left\lfloor \frac{N_{IR}}{C} \right\rfloor, K_w\right),$$

wherein $$N_{IR} = \left\lfloor \frac{N_{soft}}{K_C \cdot K_{MIMO} \cdot \min(X, M_{limit})} \right\rfloor,$$

and other parameters are the same as those defined in Release 10 of LTE TDD.

At the UE side, the UE equally divides its soft buffer to a plurality of Cells, and for each Cell and at least $K_{MIMO} \cdot \min(X, M_{limit})$ transport blocks, when one code block of one transport block fails to decode, the number of the soft buffer stored at least for this code block is $$n_{SB} = \min\left(N_{cb}, \left\lfloor \frac{N_{soft}}{C \cdot N_{cells}^{DL} \cdot K_{MIMO} \cdot \min(X, M_{limit})} \right\rfloor\right).$$

Specifically, these soft bits are described as $w_k$ $w_{k+1}, \ldots,$ $w_{mod(k+n_{SB}-1, N_{cb})}$, $w_k$ being a soft bit received by the UE, and k being a smaller index in the indexes of respective soft bits received by the UE. By implementing this exemplary method, the base station can ensure that the UE stores $n_{SB}$ soft bits for one code block, so that it can optimize the operation of HARQ IR.

In a case of CA where different uplink and downlink configurations are used in a plurality of Cells, depending on the defined timing relation of HARQ, it is likely to enable the actual maximum number of downlink HARQ processes $M_{DL\_HARQ}^{real}$ of one Cell to be within the range determined by the maximum number of downlink HARQ processes $M_{DL\_HARQ}^{R10,Pcell}$ and $M_{DL\_HARQ}^{R10,Scell}$ of respective uplink and downlink configurations of the Pcell and the Scell in Release 8 of LTE TDD, i.e., $M_{DL\_HARQ}^{real}$ is greater than or equal to the smaller value between $M_{DL\_HARQ}^{R10,Pcell}$ and $M_{DL\_HARQ}^{R10,Scell}$ and less than or equal to the greater value between $M_{DL\_HARQ}^{R10,Pcell}$ and $M_{DL\_HARQ}^{R10,Scell}$. Moreover, it is possible to ensure that $M_{DL\_HARQ}^{real}$ is within the range determined by $M_{DL\_HARQ}^{R10,Pcell}$ and $M_{DL\_HARQ}^{R10,Scell}$ through an appropriate design of HARQ timing.

Accordingly, another simplified exemplary processing method is to process the soft buffer by the greater value of the maximum number of downlink HARQ processes of respective uplink and downlink configurations of the Pcell and the Scell in Release 8 of LTE TDD, i.e., max $(M_{DL\_HARQ}^{R10,Pcell}, M_{DL\_HARQ}^{R10,Scell})$.

The base station may have a plurality of exemplary methods of processing the soft buffer. The exemplary method of a base station processing the soft buffer based on $\max(M_{DL\_HARQ}^{R10,Pcell}, M_{DL\_HARQ}^{R10,Scell})$ is described as follows: specifically, based on the exemplary method for rate matching of the base station currently defined in Release 10 of LTE TDD, the soft buffer allocated to each code block is computed by $\max(M_{DL\_HARQ}^{R10,Pcell}, M_{DL\_HARQ}^{R10,Scell})$. When the base station performs rate matching on each code block of one transport block, the size of the soft buffer of code block is $$N_{cb} = \min\left(\left\lfloor\frac{N_{IR}}{C}\right\rfloor, K_w\right),$$

wherein $$N_{IR} = \left\lfloor\frac{N_{soft}}{K_C \cdot K_{MIMO} \cdot \min\left(\min\left(M_{DL\_HARQ}^{R10,Pcell}, M_{DL\_HARQ}^{R10,Scell}\right), M_{limit}\right)}\right\rfloor,$$

and other parameters are the same as those defined in Release 10 of LTE TDD.

At the UE side, the UE equally divides its soft buffer to a plurality of Cells, and for each Cell and for at least $K_{MIMO} \cdot \min(\max(M_{DL\_HARQ}^{R10,Pcell}, M_{DL\_HARQ}^{R10,Scell}), M_{limit})$ transport blocks, when one code block of one transport block fails to decode, the number of soft bits stored at least for this code block is $$n_{SB} = \min\left(N_{cb}, \left\lfloor\frac{N_{soft}}{C \cdot N_{cells}^{DL} \cdot K_{MIMO} \cdot \min\left(\max\left(M_{DL\_HARQ}^{R10,Pcell}, M_{DL\_HARQ}^{R10,Scell}\right), M_{limit}\right)}\right\rfloor\right).$$

Specifically, these soft bits are described as $w_k, W_{k+1}, \ldots, W_{\mod(k+n_{SB}-1, N_{cb})}$, $w_k$ being a soft bit received by the UE, and k being a smaller index in the indexes of respective soft bits received by the UE. By implementing this exemplary method, the base station can ensure that the UE stores $n_{SB}$ soft bits for one transport block, so that it can optimize the operation of HARQ IR.

In a case of CA where different uplink and downlink configurations are used in a plurality of Cells, one exemplary method for defining HARQ timing is that timing relation of HARQ-ACK corresponding to downlink transmission on the Scell reuses the HARQ-ACK timing relation of a TDD uplink and downlink configuration for the Scell and for each combination of TDD uplink and downlink configurations of the Pcell and the Scell, for example, working according to Table 4.

In an exemplary method for defining HARQ-ACK timing relation of the Scell, according to the LTE TDD specification, the maximum number of downlink HARQ processes of TDD uplink and downlink configurations for determining HARQ-ACK timing relation is $M_{DL\_HARQ}^{ref}$. Another exemplary processing method, in a case of CA where different uplink and downlink configurations are used in a plurality of Cells, is to process the soft buffer by the maximum number of downlink HARQ processes of TDD uplink and downlink configurations for determining HARQ-ACK timing relation, i.e. $M_{DL\_HARQ}^{ref}$.

The base station may have a plurality of exemplary methods of processing the soft buffer. The exemplary method of a base station processing the soft buffer based on $M_{DL\_HARQ}^{ref}$ is described as follows: specifically, based on the exemplary method for rate matching of the base station currently defined in Release 10 of LTE TDD, the soft buffer allocated to each code block is computed by $M_{DL\_HARQ}^{ref}$. When the base station performs rate matching on each code block of one transport block, the size of the soft buffer of code block is $$N_{cb} = \min\left(\left\lfloor\frac{N_{IR}}{C}\right\rfloor, K_w\right),$$

wherein $$N_{IR} = \left\lfloor\frac{N_{soft}}{K_C \cdot K_{MIMO} \cdot \min\left(M_{DL\_HARQ}^{ref}, M_{limit}\right)}\right\rfloor,$$

other parameters are the same as those defined in Release 10 of LTE TDD.

At the UE side, the UE equally divides its soft buffer to a plurality of Cells, and for each Cell and for at least $K_{MIMO} \cdot \min(M_{DL\_HARQ}^{ref}, M_{limit})$ transport blocks, when one coding block of one transport block fails to decode, the number of soft bits stored at least for this code block is $$n_{SB} = \min\left(N_{cb}, \left\lfloor\frac{N_{soft}}{C \cdot N_{cells}^{DL} \cdot K_{MIMO} \cdot \min\left(M_{DL\_HARQ}^{ref}, M_{limit}\right)}\right\rfloor\right).$$

Specifically, these soft bits are described as $w_k, w_{k+1}, \ldots, w_{\mod(k+n_{SB}-1, N_{cb})}$, $w_k$ being a soft bit received by the UE, and k being a smaller index in the indexes of respective soft bits received by the UE. By implementing this exemplary method, the base station can ensure that the UE stores $n_{SB}$ soft bits for one code block, so that it can optimize the operation of HARQ IR.

According to the LTE TDD specification, the maximum number of downlink HARQ processes of TDD uplink and downlink configurations for determining HARQ-ACK timing relation is $M_{DL\_HARQ}^{ref}$, and $M_{DL\_HARQ}^{ref}$ is used to process the soft buffer in a case of CA where different uplink and downlink configurations are used in a plurality of Cells.

Taking the exemplary method of TDD uplink and downlink configurations for determining HARQ-ACK timing relation in Table 4 as an example, in a case where the downlink subframe of the Scell is a superset of downlink subframes of the Pcell, the TDD uplink and downlink configurations for determining HARQ-ACK timing relation are the TDD uplink and downlink configurations of the Scell, so $M_{DL\_HARQ}^{ref}$ equals to the actual maximum number of downlink HARQ processes $M_{DL\_HARQ}^{ref}$ of the Scell, i.e., the actual maximum number of downlink HARQ processes $M_{DL\_HARQ}^{Scell,R10}$ of the Scell defined in Release 10 of LTE. In a case where the downlink subframe of the Scell is a subset of downlink subframes of the Pcell, and that the downlink subframe of the Scell is neither the subset of nor the superset of downlink subframes of the Pcell, the uplink and downlink configurations of TDD for determining HARQ-ACK timing relation are different with the uplink and downlink configurations of the Scell, so $M_{DL\_HARQ}^{ref}$ does not equal to the actual maximum number of downlink HARQ processes $M_{DL\_HARQ}^{ref}$ of the Scell, and renders a certain performance loss.

Similarly, for cross-carrier scheduling, the HARQ-ACK timing relation of downlink transmission of the Scell is normally determined according to the uplink and downlink timing relation of the Pcell. As shown in Table 5, in a case where the downlink subframe of the Scell is a superset of downlink subframes of the Pcell, downlink subframes available for downlink transmission on the Scell are identical with those on the Pcell, whereby $M_{DL\_HARQ}^{ref}$ obtained according to uplink and downlink configurations of the Pcell equals to the actual maximum number of downlink HARQ processes $M_{DL\_HARQ}^{ref}$ of downlink transmission on the Scell. In a case where the downlink subframe of the Scell is a subset of downlink subframes of the Pcell, and that the downlink subframe of the Scell is neither the subset of nor the superset of downlink subframes of the Pcell, downlink subframes available for downlink transmission on the Scell are different with those on the Pcell, resulting in that the parameter $M_{DL\_HARQ}^{ref}$ determined by HARQ-ACK timing relation of the Pcell being different with the actual maximum number of downlink HARQ processes $M_{DL\_HARQ}^{ref}$ of the Scell, and rendering a certain performance loss.

One exemplary processing method is obtaining the parameter $M_{DL\_HARQ}^{max}$ for processing the soft buffer by calculation based on the maximum number of downlink HARQ processes $M_{DL\_HARQ}^{ref}$ of TDD uplink and downlink configurations for determining HARQ-ACK timing relation, and processing the soft buffer based on the parameter $M_{DL\_HARQ}^{ref}$. Comparing the maximum number of downlink HARQ processes $M_{DL\_HARQ}^{ref}$ of TDD uplink and downlink configurations for determining HARQ-ACK timing relation and the actual maximum number of downlink HARQ processes $M_{DL\_HARQ}^{ref}$ of the Scell of Table 4 or Table 5, in a case where the downlink subframe of the Scell is a superset of downlink subframes of the Pcell, $M_{DL\_HARQ}^{max}$ equals to $M_{DL\_HARQ}^{ref}$. In a case where the downlink subframe of the Scell is a subset of downlink subframes of the Pcell and that the downlink subframe of the Scell is neither the subset of nor the superset of downlink subframes of the Pcell, $M_{DL\_HARQ}^{ref}$ is less than $M_{DL\_HARQ}^{ref}$ by at least one, so $M_{DL\_HARQ}^{max}$ can be defined as equaling to $M_{DL\_HARQ}^{ref}-1$.

The base station may have a plurality of exemplary methods of processing the soft buffer. The exemplary method of a base station processing the soft buffer based on $M_{DL\_HARQ}^{ref}$ is described as follows: the parameter $M_{DL\_HARQ}^{max}$ obtained by the calculation hereinabove is used to compute the soft buffer allocated to each code block, based on the exemplary method for rate matching of the base station currently defined in Release 10 of LTE TDD. The size of the soft buffer of code block is $$N_{cb} = \min\left(\left\lfloor \frac{N_{IR}}{C} \right\rfloor, K_w\right)$$

when the base station performs rate matching on each code block of one transport block, wherein $$N_{IR} = \left\lfloor \frac{N_{soft}}{K_C \cdot K_{MIMO} \cdot \min(M_{DL\_HARQ}^{max}, M_{limit})} \right\rfloor,$$

and other parameters are the same as those defined in Release 10 of LTE TDD.

At the UE side, the UE equally divides its soft buffer to a plurality of Cells, and for each Cell and at least $K_{MIMO}$·min $(M_{DL\_HARQ}^{max}, M_{limit})$ transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{max}, M_{limit})} \right\rfloor\right).$$

Specifically, these soft bits are described as $w_k, w_{k+1}, \ldots, w_{mod(k+n_{SB}-1, N_{cb})}$, $w_k$ being a soft bit received by the UE and k being a smaller index in the indexes of respective soft bits received by the UE. By implementing this exemplary method, the base station can ensure that the UE stores $n_{SB}$ soft bits for one code block, so that it can optimize the operation of HARQ IR.

In another exemplary processing method, in Release 10 of LTE TDD, the parameter used for processing the soft buffer is the smaller value of the maximum number of downlink HARQ processes $M_{DL\_HARQ}$ of Cell and constant $M_{limit}$ (equivalent to 8 constantly), i.e., $\min(M_{DL\_HARQ}, M_{limit})$. Thus, in respect to the above exemplary method of processing the soft buffer based on the maximum number of downlink HARQ processes $M_{DL\_HARQ}^{ref}$ of TDD uplink and downlink configurations for determining HARQ-ACK timing relation, another exemplary method for improving performance is modifying the parameter $M_{limit}$ to approach the actual maximum number of downlink HARQ processes $M_{DL\_HARQ}^{ref}$ as close as possible. The cap parameter of the maximum number of downlink HARQ processes after modification is described as $M_{limit}^{ref}$.

Comparing the maximum number of downlink HARQ processes $M_{DL\_HARQ}^{ref}$ of TDD uplink and downlink configurations for determining HARQ-ACK timing relation and the actual maximum number of downlink HARQ processes $M_{DL\_HARQ}^{ref}$ of the Scell of Table 4 or Table 5, in a case where the downlink subframe of the Scell is a superset of downlink subframes of the Pcell, $M_{DL\_HARQ}^{ref}$ equals to $M_{DL\_HARQ}^{ref}$ so the value of $M_{limit}$ in Release 10 of LTE can be kept unvaried, i.e., still setting $M_{limit}^{ref}=M_{limit}=8$. The cases where downlink subframe of the Scell is a subset of downlink subframes of the Pcell and where the downlink subframe of the Scell is neither the subset of nor the superset of downlink subframes of the Pcell are further treated respectively based on the uplink and downlink configurations of the Scell. Specifically, when the uplink and downlink configurations of the Scell are 1, 2, 3, 4 or 5, the actual maximum number of downlink HARQ processes $M_{DL\_HARQ}^{ref}$ of the Scell for determining HARQ-ACK timing relation in Table 4 or 5 are both larger than or equivalent to 8, so $M_{limit}^{ref}=M_{limit}=8$ can still be set. When the uplink and downlink configurations of the Scell are 0 or 6, the actual maximum number of downlink HARQ processes $M_{DL\_HARQ}^{ref}$ of the Scell for determining HARQ-ACK timing relation in Table 4 or 5 are both less than or equivalent to 7, so and $M_{limit}^{ref}=7$ can be set. Thus, $M_{DL\_HARQ}^{ref}$ and $M_{limit}^{ref}$ determined according to different situations hereinabove are used to process the soft buffer.

The base station may have a plurality of exemplary methods of processing the soft buffer. The exemplary method of a base station processing the soft buffer based on $M_{DL\_HARQ}^{ref}$ and $M_{limit}^{ref}$ determined according to different situations hereinabove is described as follows: $M_{DL\_HARQ}^{ref}$ and $M_{limit}^{ref}$ determined according to different situations hereinabove are used to compute the soft buffer allocated to each code block, based on the exemplary method for rate matching of the base station currently defined in Release 10 of LTE TDD. The size of the soft buffer of code block is $$N_{cb} = \min\left(\left\lfloor \frac{N_{IR}}{C} \right\rfloor, K_w\right)$$

when the base station performs rate matching on each code block of one transport block, wherein $$N_{IR} = \left\lfloor \frac{N_{soft}}{K_C \cdot K_{MIMO} \cdot \min(M_{DL\_HARQ}^{ref}, M_{limit}^{ref})} \right\rfloor,$$

and other parameters are the same as those defined in Release 10 of LTE TDD.

At the UE side, the UE equally divides its soft buffer to a plurality of Cells, and for each Cell and at least $K_{MIMO}$·min $(M_{DL\_HARQ}^{ref}, M_{limit}^{ref})$ transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{ref}, M_{limit}^{ref})} \right\rfloor\right).$$

Specifically, these soft bits are described as $w_k, w_{k+1}, \ldots, w_{mod(k+n_{SB}-1, N_{cb})}$ $w_k$ being a soft bit received by the UE and k being a smaller index in the indexes of respective soft bits received by the UE. By implementing this exemplary method, the base station can ensure that the UE stores $n_{SB}$ soft bits for one code block, so that it can optimize the operation of HARQ IR.

In combination with the above two exemplary methods, on one hand, the parameter $M_{DL\_HARQ}^{max}$ is obtained by calculation based on the maximum number of downlink HARQ processes $M_{DL\_HARQ}^{ref}$ of TDD uplink and downlink configurations for determining HARQ-ACK timing relation in table 4 or table 5. On the other hand, the modified parameter $M_{limit}^{ref}$ is obtained based on the TDD uplink and downlink configurations for determining HARQ-ACK timing relation in table 4 or table 5, and ref consequently, $M_{DL\_HARQ}^{max}$, $M_{limit}^{ref}$ are used to process the soft buffer.

The base station may have a plurality of exemplary methods of processing the soft buffer. The exemplary method of a base station processing the soft buffer based on $M_{DL\_HARQ}^{ref}$ and $M_{limit}^{ref}$ determined according to different situations hereinabove is described as follows: $M_{DL\_HARQ}^{max}$ and $M_{limit}^{ref}$ determined according to different situations hereinabove are used to compute the soft buffer allocated to each code block, based on the exemplary method for rate matching of the base station currently defined in Release 10 of LTE TDD. The size of the soft buffer of code block is $$N_{cb} = \min\left(\left\lfloor \frac{N_{IR}}{C} \right\rfloor, K_w\right)$$

when the base station performs rate matching on each code block of one transport block, wherein $$N_{IR} = \left\lfloor \frac{N_{soft}}{K_C \cdot K_{MIMO} \cdot \min(M_{DL\_HARQ}^{max}, M_{limit}^{ref})} \right\rfloor,$$

and other parameters are the same as those defined in Release 10 of LTE TDD.

At the UE side, the UE equally divides its soft buffer to a plurality of Cells, and for each Cell and at least $K_{MIMO}$·min $(M_{DL\_HARQ}^{max}, M_{limit}^{ref})$ transport blocks, when one code block of one transport block fails to decode, the number of soft bits stored at least for this code block is $$n_{SB} = \min\left(N_{cb}, \left\lfloor \frac{N_{soft}}{C \cdot N_{cells}^{DL} \cdot K_{MIMO} \cdot \min(M_{DL\_HARQ}^{max}, M_{limit}^{ref})} \right\rfloor\right).$$

Specifically, these soft bits are described as $w_k, w_{k+1}, \ldots, w_{mod(k+n_{SB}-1, N_{cb})}$ $w_k$ being a soft bit received by the UE and k being a smaller index in the indexes of respective soft bits received by the UE. By implementing this exemplary method, the base station can ensure that the UE stores $n_{SB}$ soft bits for one code block, so that it can optimize the operation of HARQ IR.

It shall be interpreted that when the UE processes the soft buffer based on any one of the parameters $M_{DL\_HARQ}^{real}$, $M_{DL\_HARQ}^{R10,Scell}$, $M_{DL\_HARQ}^{R10,Pcell}$, X, max $(M_{DL\_HARQ}^{R10,Pcell}, M_{DL\_HARQ}^{R10,Scell})$, $M_{DL\_HARQ}^{max}$, $M_{limit}^{ref}$, and $M_{DL\_HARQ}^{ref}$, the base station can select the ways based on any one of these parameters to process the soft buffer. The above one-to-one examples are only presented for illustrating exemplary embodiments of the present invention, and in practical use, the combinations of preceding ways may be selected and matched in any way per specific requirements. If the base station and the UE adopt the same parameter to process the soft buffer, the consistency of operations can be maintained. However, if the base station and the UE adopt different parameters to process the soft buffer, it will be favorable to optimize under different conditions.

In step S420, the UE receives information issued by the PDCCH and the PDSCH by the base station.

The UE receives the PDSCH sent by the base station, and determines parameter of processing the soft buffer according to uplink and downlink configurations of the Pcell and the Scell and accordingly performs the soft buffer for soft bits of the PDSCH, when the determining of the PDSCH decoding fails.

Figure 5:
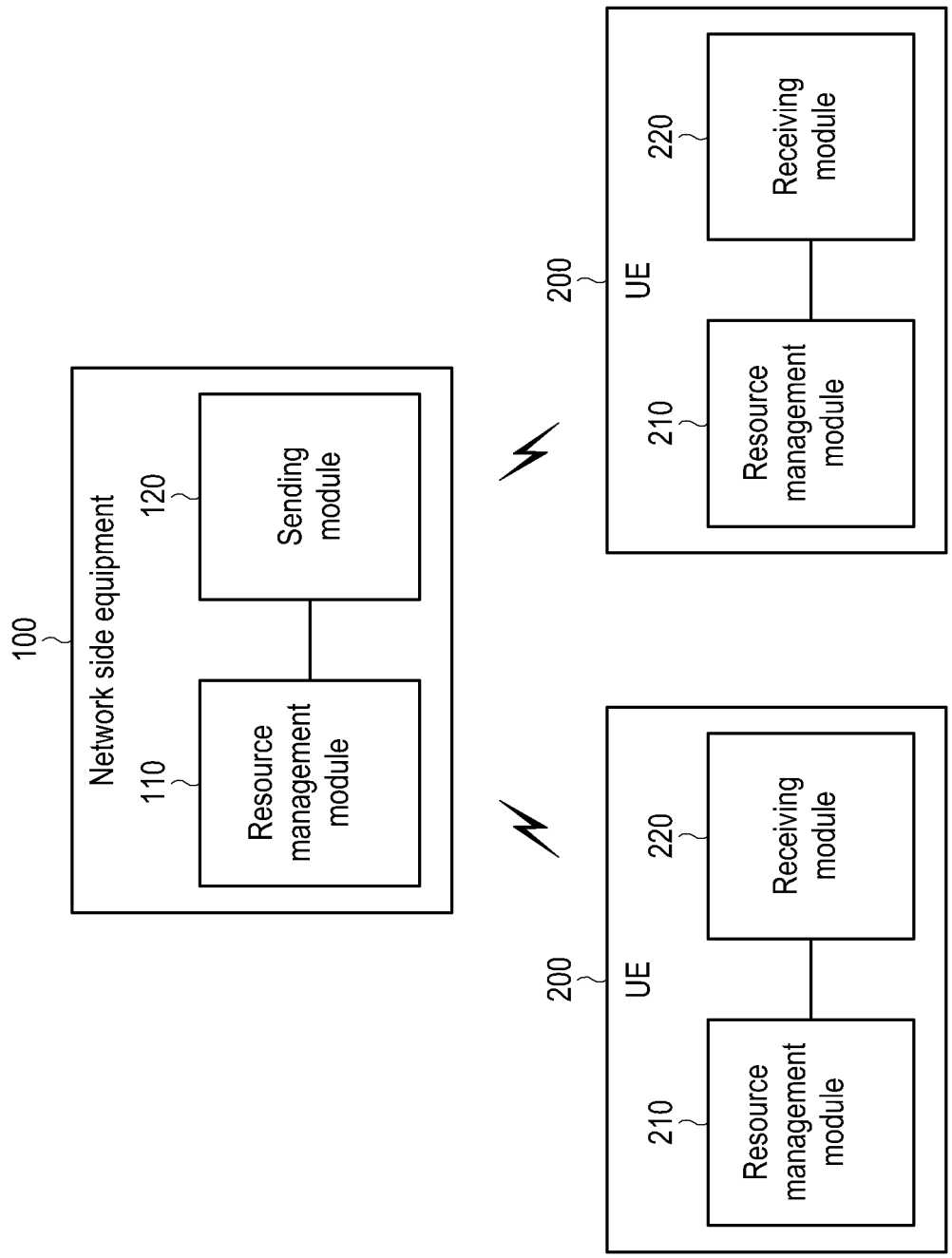
FIG. 5 is a block diagram of a structure of a network side equipment and a User Equipment (UE) according to an exemplary embodiment of the present invention.

Corresponding to the above exemplary method, as shown in FIG. 5, the exemplary embodiment of the present invention also sets forth network side equipment 100, comprising a resource management module 110 and a sending module 120.

The resource management module 110 is used to allocate a transmission resource for the UE, and process the soft buffer based on parameter of the soft buffer when the uplink and downlink configurations of a plurality of Cells of the UE CA are different, wherein the parameter of the soft buffer is determined by the Pcell and/or the Scell uplink and downlink configurations of the UE. The sending module 120 is used to perform rate matching on the PDSCH and send data to the UE by the PDCCH and the PDSCH.

Specifically, the resource management module 110 processes the soft buffer based on a parameter of the soft buffer, wherein selection of parameter of the soft buffer includes any one or more of the following manners:

the parameter of the soft buffer is the actual maximum number of downlink HARQ processes of each Cell, based on which the soft buffer is processed, the parameter of the soft buffer is the maximum number of downlink HARQ processes defined by the uplink and downlink configurations of the Scell or the Pcell in Release 10 of LTE TDD, based on which the soft buffer is processed, the parameter of the soft buffer is a predefined fixed value of the maximum number of downlink HARQ processes, based on which the soft buffer is processed, or the parameter of the soft buffer is a greater value of the maximum number of downlink HARQ processes of respective uplink and downlink configurations of the Pcell and the Scell in Release 8 of LTE TDD, based on which the soft buffer is processed, or the parameter of the soft buffer is the maximum number of downlink HARQ processes of TDD uplink and downlink configurations for determining HARQ-ACK timing relation, based on which the soft buffer is processed.

The parameter of the soft buffer is parameter $M_{DL\_HARQ}^{max}$ available for processing the soft buffer, which is obtained by calculation based on the maximum number of downlink HARQ processes $M_{DL\_HARQ}^{ref}$ of TDD uplink and downlink configurations for determining HARQ-ACK timing relation, and $M_{DL\_HARQ}^{max}$ is used for processing the soft buffer. Wherein, $M_{DL\_HARQ}^{max}$ is obtained by calculation based on the maximum number of downlink HARQ processes $M_{DL\_HARQ}^{ref}$ of TDD uplink and downlink configurations for determining HARQ-ACK timing relation:

In a case where the downlink subframe of the Scell is a superset of downlink subframes of the Pcell, $M_{DL\_HARQ}^{max}$ equals to $M_{DL\_HARQ}^{ref}$, and In a case where the downlink subframe of the Scell is a subset of downlink subframes of the Pcell, and that the downlink subframe of the Scell is neither the subset of nor the superset of downlink subframes of the Pcell, $M_{DL\_HARQ}^{max}$ equals to $M_{DL\_HARQ}^{ref}-1$.

The parameters of the soft buffer are the maximum number of downlink HARQ processes $M_{DL\_HARQ}^{ref}$ of TDD uplink and downlink configurations for determining HARQ-ACK timing relation and the cap parameter $M_{limit}^{ref}$ of the maximum number of downlink HARQ processes after change, and the soft buffer is processed based on $M_{DL\_HARQ}^{ref}$ and $M_{limit}^{ref}$. Wherein, in a case where the downlink subframe of the Scell is a subset of downlink subframes of the Pcell, and that the downlink subframe of the Scell is neither the subset of nor the superset of downlink subframes of the Pcell, and when the uplink and downlink configurations of the Scell is 0 or 6, $M_{limit}^{ref}=7$, and in other cases, $M_{limit}^{ref}=8$.

The parameters of the soft buffer are $M_{DL\_HARQ}^{max}$ and $M_{limit}^{ref}$ and the soft buffer is processed based on $M_{DL\_HARQ}^{max}$ and $M_{limit}^{ref}$.

FIG. 5 is a block diagram of a structure of a network side equipment and a UE according to an exemplary embodiment of the present invention.

Referring to FIG. 5, the exemplary embodiment of the present invention also sets forth a UE 200, comprising a resource management module 210 and a receiving module 220.

The resource management module 210 is used to determine transmission resource information that the base station allocates for it, and process the soft buffer based on parameter of the soft buffer when the uplink and downlink configurations of a plurality of Cells of the UE CA are different, wherein the parameter of the soft buffer is determined by the Pcell and/or the Scell uplink and downlink configurations of UE. The receiving module 220 is used to receive the PDCCH and the PDSCH sent by the base station according to the transmission resource and the parameter for processing the soft buffer.

Specifically, the resource management module 210 processes the soft buffer according to the parameter of the soft buffer, wherein selection of the parameter of the soft buffer includes any one or more of the following manners:

the parameter of the soft buffer is the actual maximum number of downlink HARQ processes of each Cell, based on which the soft buffer is processed, the parameter of the soft buffer is the maximum number of downlink HARQ processes defined by the uplink and downlink configurations of the Scell or the Pcell in Release 10 of LTE TDD, based on which the soft buffer is processed, the parameter of the soft buffer is a predefined fixed value of the maximum number of downlink HARQ processes, based on which the soft buffer is processed, the parameter of the soft buffer is a greater value of the maximum number of downlink HARQ processes of respective uplink and downlink configurations of the Pcell and the Scell in Release 8 of LTE TDD, based on which the soft buffer is processed, or the parameter of the soft buffer is the maximum number of downlink HARQ processes of TDD uplink and downlink configurations for determining HARQ-ACK timing relation, based on which the soft buffer is processed.

The parameter of the soft buffer is parameter $M_{DL\_HARQ}^{max}$ available for processing the soft buffer, which is obtained by calculation based on the maximum number of downlink HARQ processes $M_{DL\_HARQ}^{ref}$ of TDD uplink and downlink configurations for determining HARQ-ACK timing relation, and $M_{DL\_HARQ}^{max}$ is used for processing the soft buffer. Wherein, $M_{DL\_HARQ}^{max}$ is obtained by calculation based on the maximum number of downlink HARQ processes $M_{DL\_HARQ}^{ref}$ of TDD uplink and downlink configurations for determining HARQ-ACK timing relation:

In a case where the downlink subframe of the Scell is a superset of downlink subframes of the Pcell, $M_{DL\_HARQ}^{max}$ equals to $M_{DL\_HARQ}^{ref}$, and In a case where the downlink subframe of the Scell is a subset of downlink subframes of the Pcell, and that the downlink subframe of the Scell is neither the subset of nor the superset of downlink subframes of the Pcell, $M_{DL\_HARQ}^{max}$ equals to $M_{DL\_HARQ}^{ref}-1$.

The parameters of the soft buffer are the maximum number of downlink HARQ processes $M_{DL\_HARQ}^{ref}$ of TDD uplink and downlink configurations for determining HARQ-ACK timing relation and the cap parameter $M_{limit}^{ref}$ of the maximum number of downlink HARQ processes after change, and the soft buffer is processed based on $M_{DL\_HARQ}^{ref}$ and $M_{limit}^{ref}$. Wherein, in a case where the downlink subframe of the Scell is a subset of downlink subframes of the Pcell, and that the downlink subframe of the Scell is neither the subset of nor the superset of downlink subframes of the Pcell, and when the uplink and downlink configurations of the Scell is 0 or 6, $M_{limit}^{ref}=7$, and in other cases, $M_{limit}=8$.

The parameters of the soft buffer are $M_{DL\_HARQ}^{max}$ and $M_{limit}^{ref}$ and the soft buffer is processed based on $M_{DL\_HARQ}^{max}$ and $M_{limit}^{ref}$.

The above exemplary methods or equipments set forth in the present invention are capable of reasonably and efficiently addressing the issues of the soft buffer processing of data in HARQ downlink transmission in a CA system where uplink and downlink configurations of a plurality of Cells are different, optimizing the operation of HARQ incremental redundancy, and improving decoding performance of a UE. The above scheme set forth in exemplary embodiments of the present invention only has a little change to the system of the related art and will not affect the compatibility of the system.

A person skilled in the art can appreciate that the whole or part of steps carried for achieving the above exemplary method, which can be accomplished by a program instructing the relevant hardware (e.g., at least one controller), and the program can be stored in a non-transitory computer readable memory medium, and includes one of the steps of the exemplary method or the combination thereof during implementation.

In addition, the respective functional units in the respective exemplary embodiments of the present invention can be aggregated in a processing module, can singly, physically exist, and can be aggregated in a module by two or more units. The above aggregated module can be carried out not only by means of hardware but also by means of software functional module. Moreover, the aggregated module can also be stored in a non-transitory computer readable memory medium if it is carried out by means of software functional module and is sold or used as an independent product.

The memory medium mentioned above may be a Read Only Memory (ROM), a memory device, such as a Random Access Memory (RAM), a memory chip, or an Integrated Circuit (IC), and an optical or a magnetic recording medium, such as a Compact Disk (CD), a Digital Versatile Disk (DVD), a magnetic disk, a magnetic tape, and the like. The storage device or the storage medium is a machine-readable storage unit that is suitable for storing programs including instructions for implementing exemplary embodiments of the present invention.

The foregoing is part of the exemplary embodiments of the present invention. It should be noted that on the premise of not disengaging the principle of the present invention, the person skilled in the art can also make several improvement and modification which should be deemed as the protection scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving data at a receiver in a wireless system, the method comprising:
receiving information on uplink and downlink (UL/DL) configurations for a time division duplex (TDD) mode corresponding to at least two serving cells that are configured to the receiver, wherein the at least two serving cells comprise a primary cell (Pcell) and a secondary cell (Scell),
determining a reference UL/DL configuration for the Scell based on a UL/DL configuration of the Scell and a UL/DL configuration of the Pcell if the UL/DL configuration of the Scell is different from the UL/DL configurations of the Pcell,
determining a size of a soft buffer for the Scell based on the reference UL/DL configuration, and
receiving the data based on the size of the soft buffer.

2. The method of claim 1, wherein the size of the soft buffer for the Scell is determined based on a maximum number of downlink hybrid automatic repeat request (HARQ) processes corresponding to the reference UL/DL configuration.

3. The method of claim 1, wherein the information on UL/DL configurations for the TDD mode comprises indexes of the UL/DL configurations for the TDD mode.

4. The method of claim 3,
wherein the reference UL/DL configuration for the Scell is a first UL/DL configuration if a set of an index of the UL/DL configurations of the Pcell and an index UL/DL configurations of the Scell is one of (1,0), (1,6), (0,1), and (6,1),
wherein the reference UL/DL configuration for the Scell is a second UL/DL configuration if a set of an index of the UL/DL configurations of the Pcell and an index UL/DL configurations of the Scell is one of (2,0), (2,1), (2,6), (0,2), (1,2) and (6,2),
wherein the reference UL/DL configuration for the Scell is a third UL/DL configuration if a set of an index of the UL/DL configurations of the Pcell and an index UL/DL configurations of the Scell is one of (3,0), (3,6), (0,3), and (6,3),
wherein the reference UL/DL configuration for the Scell is a fourth UL/DL configuration if a set of an index of the UL/DL configurations of the Pcell and an index UL/DL configurations of the Scell is one of (4,0), (4,1), (4,3), (4,6), (0,4), (1,4), (3,4), (6,4), (3,1), and (1,3),
wherein the reference UL/DL configuration for the Scell is a fifth UL/DL configuration if a set of an index of the UL/DL configurations of the Pcell and an index UL/DL configurations of the Scell is one of (5,0), (5,1), (5,2), (5,3), (5,4), (5,6), (0,5), (1,5), (2,5), (3,5), (4,5), (6,5), (3,2), (4,2), (2,3), and (2,4), and
wherein the reference UL/DL configuration for the Scell is a sixth UL/DL configuration if a set of an index of the UL/DL configurations of the Pcell and an index UL/DL configurations of the Scell is one of (6,0) and (0,6).

5. The method of claim 1, further comprising:
determining a size of a soft buffer for the Pcell based on a UL/DL configuration for the Pcell.

6. A receiver for receiving data, the receiver comprising:
at least one processor; and
at least one memory storing one or more computer programs configured to be executed by the at least one processor, the one or more computer programs including instructions for:
receiving information on uplink and downlink (UL/DL) configurations for a time division duplex (TDD) mode corresponding to at least two serving cells that are configured to the receiver, wherein the at least two serving cells comprise a primary cell (Pcell) and a secondary cell (Scell),
determining a reference UL/DL configuration for the Scell based on a UL/DL configuration of the Scell and a UL/DL configuration of the Pcell if the UL/DL configuration of the Scell is different from the UL/DL configurations of the Pcell, determining a size of a soft buffer for the Scell based on the reference UL/DL configuration, and receiving the data using the size of the soft buffer.

7. The receiver of claim 6, wherein the size of the soft buffer for the Scell is determined based on a maximum number of downlink hybrid automatic repeat request (HARQ) processes corresponding to the reference UL/DL configuration.

8. The receiver of claim 6, wherein the information on UL/DL configurations for the TDD mode comprises indexes of the UL/DL configurations for the TDD mode.

9. The receiver of claim 8, wherein the reference UL/DL configuration for the Scell is a first UL/DL configuration if a set of an index of the UL/DL configurations of the Pcell and an index UL/DL configurations of the Scell is one of (1,0), (1,6), (0,1), and (6,1), wherein the reference UL/DL configuration for the Scell is a second UL/DL configuration if a set of an index of the UL/DL configurations of the Pcell and an index UL/DL configurations of the Scell is one of (2,0), (2,1), (2,6), (0,2), (1,2), and (6,2), wherein the reference UL/DL configuration for the Scell is a third UL/DL configuration if a set of an index of the UL/DL configurations of the Pcell and an index UL/DL configurations of the Scell is one of (3,0), (3,6), (0,3), and (6,3), wherein the reference UL/DL configuration for the Scell is a fourth UL/DL configuration if a set of an index of the UL/DL configurations of the Pcell and an index UL/DL configurations of the Scell is one of (4,0), (4,1), (4,3), (4,6), (0,4), (1,4), (3,4), (6,4), (3,1), and (1,3), wherein the reference UL/DL configuration for the Scell is a fifth UL/DL configuration if a set of an index of the UL/DL configurations of the Pcell and an index UL/DL configurations of the Scell is one of (5,0), (5,1), (5,2), (5,3), (5,4), (5,6), (0,5), (1,5), (2,5), (3,5), (4,5), (6,5), (3,2), (4,2), (2,3), and (2,4), and wherein the reference UL/DL configuration for the Scell is a sixth UL/DL configuration if a set of an index of the UL/DL configurations of the Pcell and an index UL/DL configurations of the Scell is one of (6,0) and (0,6).

10. The receiver of claim 6, wherein the at least one processor is further configured to determine a size of a soft buffer for the Pcell based on a UL/DL configuration for the Pcell.

* * * * *